(12) United States Patent
Takimoto

(10) Patent No.: US 7,473,872 B2
(45) Date of Patent: Jan. 6, 2009

(54) COOKING TOOL

(75) Inventor: Hitoshi Takimoto, Aichi (JP)

(73) Assignees: Kabushiki Kaisha Toshiba, Tokyo (JP); Toshiba Ha Products Co., Ltd., Osaka (JP); Toshiba Consumer Marketing Coporation, Tokyo (JP)

( * ) Notice: Subject to any disclaimer, the term of this patent is extended or adjusted under 35 U.S.C. 154(b) by 143 days.

(21) Appl. No.: 10/580,216

(22) PCT Filed: Aug. 30, 2004

(86) PCT No.: PCT/JP2004/012498

§ 371 (c)(1),
(2), (4) Date: May 23, 2006

(87) PCT Pub. No.: WO2005/053362

PCT Pub. Date: Jun. 9, 2005

(65) Prior Publication Data

US 2007/0080158 A1 Apr. 12, 2007

(30) Foreign Application Priority Data

Nov. 25, 2003 (JP) ............................. 2003-393808

(51) Int. Cl.
*H05B 6/00* (2006.01)
*H05B 6/12* (2006.01)

(52) U.S. Cl. .................................... 219/627; 219/618

(58) Field of Classification Search ................. 219/620, 219/621, 622, 623, 624, 625, 626, 627
See application file for complete search history.

(56) References Cited

U.S. PATENT DOCUMENTS

| 3,710,075 | A | * | 1/1973 | Jablonowski | ............... 607/108 |
| 3,781,506 | A | * | 12/1973 | Ketchum et al. | ............. 219/627 |
| 5,643,485 | A | * | 7/1997 | Potter et al. | .................. 219/621 |
| 6,504,135 | B2 | * | 1/2003 | Clothier et al. | ............. 219/624 |
| 6,953,919 | B2 | * | 10/2005 | Clothier | ...................... 219/620 |
| 6,957,111 | B2 | * | 10/2005 | Zhu et al. | ...................... 700/90 |

FOREIGN PATENT DOCUMENTS

| JP | H01-114298 | 5/1989 |
| JP | 2-93231 A | 4/1990 |
| JP | H03-25885 | 2/1991 |
| JP | H06-20766 | 1/1994 |
| JP | H10-165294 | 6/1998 |
| JP | 2004-95312 A | 3/2004 |

\* cited by examiner

*Primary Examiner*—Daniel L Robinson
(74) *Attorney, Agent, or Firm*—Pillsbury Winthrop Shaw Pittman, LLP

(57) ABSTRACT

A heat cooking apparatus includes a supporting unit for supporting a cooking tool, a heating unit for heating the cooking tool, a receiving unit capable of receiving temperature data of the cooking tool transmitted in the form of infrared rays from the exterior, and a controlling unit for controlling the heating unit on the basis of temperature data received by the receiving unit.

8 Claims, 19 Drawing Sheets

COOKING TOOL

This is the U.S. National Stage of International Patent Application No. PCT/JP2004/012498, filed on Aug. 30, 2004, which, in turn, relies for priority upon Japanese Patent Application No. 2003-393808, filed Nov. 25, 2003, the contents of both of which are incorporated herein by reference in their entireties.

TECHNICAL FIELD

The present invention relates to a cooking tool for use with a heat cooking apparatus.

BACKGROUND ART

FIG. 19 depicts an example of the related art heat cooking device. A thermistor 102 is provided in the vicinity of the center of IH coil 101. This heat cooking device is arranged such that the surface temperature of a cooking tool 103 placed on a top plate 104 is indirectly detected by the thermistor 102. During automatic water boiling process, the heat cooking device lowers the caloric force stepwise from a high value to a low value via a middle value as the temperature detected by the thermistor 102 rises. When the percent change of detected temperature at a low caloric force becomes smaller than predetermined criterion, water boiling is then detected.

As another background art, there is disclosed in JP-A-2003-139385 a bath temperature detecting device for obtaining the temperature of hot water in a bath tub comprising an electric supply unit, a temperature detecting unit of detecting the temperature of hot water in the bath tub and a transmitting unit of wireless-transmitting the temperature data thus detected to the bath system.

DISCLOSURE OF THE INVENTION

Problem to be Overcome by the Invention

The aforementioned heat cooking device performs stepwise control of lowering calorific force and thus requires a prolonged cooking time. This stepwise control of lowering caloric force is aimed at detecting the actual temperature of the cooking tool 103 at a high precision as described in the following aspects (1) to (3). Accordingly, when the stepwise control of lowering caloric force is suspended, the actual temperature of the cooking tool 103 cannot be detected at a high precision, making it impossible to finish cooking as desired.

(1) Since the lead wire 105 of the thermistor 102 is induction-heated under the effect of magnetic field from IH coil 101, the temperature detected by the thermistor 102 is higher than the actual temperature. Therefore, the caloric force is stepwise lowered to eliminate the effect of magnetic field on the lead wire 105 so that the detected temperature is close to the actual temperature.

(2) Since there is a top plate 104 causing temperature gradient present between the cooking tool 103 and the thermistor 102, the temperature detected by the thermistor doesn't follow the actual temperature when the cooking tool 103 is continuously heated at a high caloric force. Therefore, the caloric force is stepwise lowered to make a positive delay in the temperature rise of the cooking tool 103 so that the detected temperature can follow the actual temperature.

(3) When the cooking tool 103 is continuously heated at a high caloric force, the actual temperature of the cooking tool 103 rises at the same rate as before boiling also after reaching boiling temperature. Therefore, when the percent change of detected temperature falls below criterion, water has already been boiled, causing some delay in the detection of boiling. Accordingly, the caloric force is stepwise lowered to reduce the percent change of temperature of the cooking tool 103 when water is boiled, preventing the occurrence of delay in the detection of boiling.

It is therefore an aim of the invention to provide a cooking tool for use in a heat cooking apparatus capable of finishing cook as desired in a short period of time.

Means for Overcoming the Problem

A cooking tool which is used with a heat cooking apparatus having a receiving unit capable of receiving data externally transmitted in the form of infrared rays, the cooking tool being heated by a heating unit of the heat cooking apparatus while being supported by a supporting unit of the heat cooking apparatus, characterized by:

a temperature detecting unit generating a signal according to a temperature of an object to be cooked accommodated;

a transmitting unit transmitting temperature data corresponding to the output signal from the temperature detecting unit in the form of infrared rays to the heat cooking apparatus; and characterized in that the transmitting unit is provided with a rectifying portion rectifying the output voltage from the secondary coil and a stabilizing electric supply portion of stabilizing the rectified output voltage from the rectifying portion; and further characterized by a primary coil and a secondary coil, and in that in a case where a high frequency current is caused to flow through the primary coil so that a heating unit provided in the heat cooking apparatus performs an induction heating, the secondary coil is magnetically coupled to the primary coil by passing a high frequency current through a primary coil, there is provided a secondary coil magnetically connected to the primary coil while the heating unit is being driven for producing an electric power for operating the transmitting unit.

The actual temperature of the cooking tool can be detected with a high precision without making any stepwise control for reducing the caloric force. Therefore, the cooking tool can be continuously heated with a high caloric force, making it possible to finish cook as desired in a short period of time. Further, since infrared rays to be used as transmitting media for temperature data can be transmitted over a wider range than electric wave and are not affected by magnetic field, temperature data can be transmitted to the receiving unit accurately and certainly without being affected by the installation position of the cooking tool.

BEST MODE FOR CARRYING OUT THE INVENTION

The invention will be further described in connection with the attached drawings.

Embodiment 1

A first embodiment of implementation of the invention will be described in connection with FIGS. 1 and 10.

Figure 1:
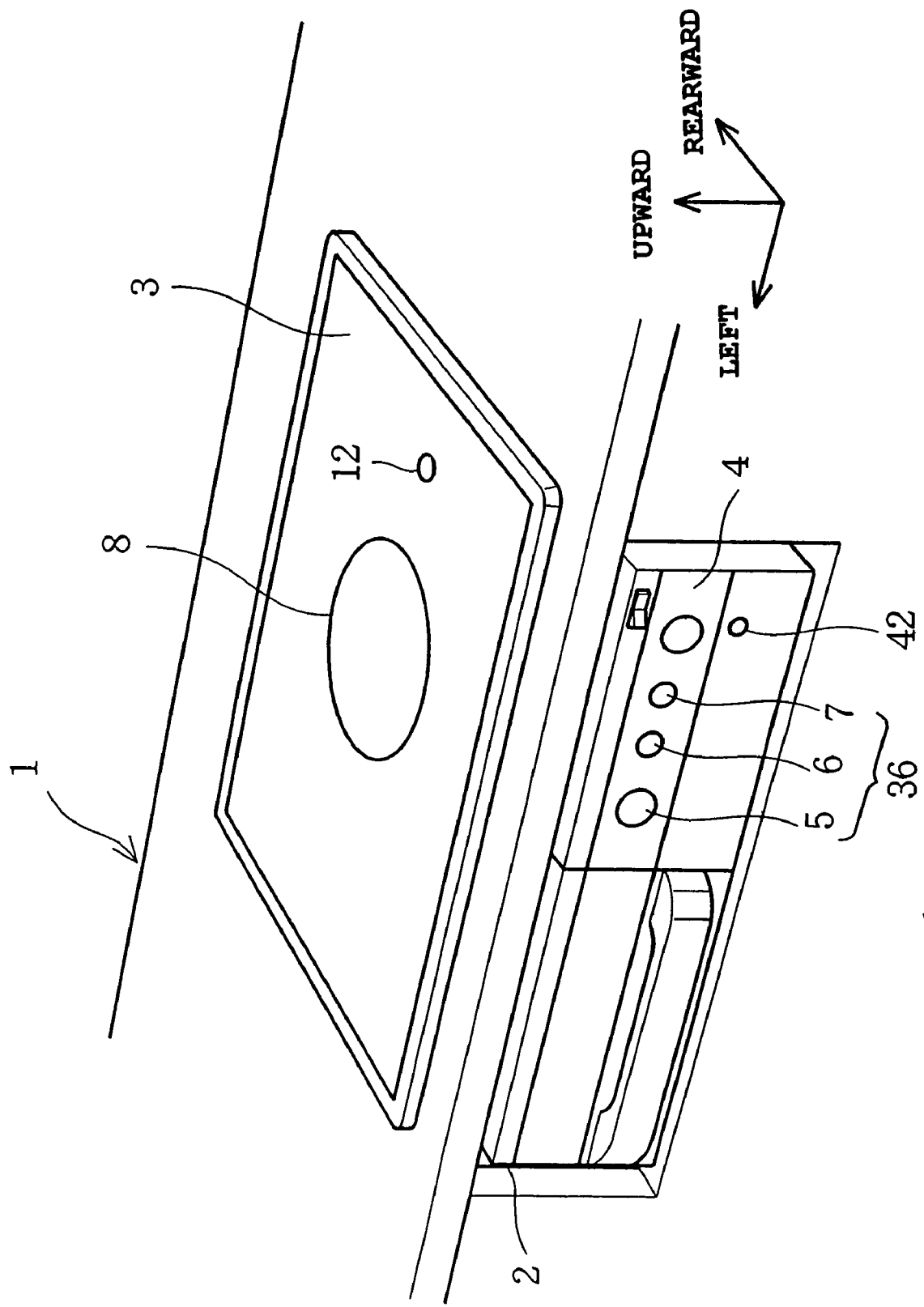
FIG. 1 is a perspective view illustrating the external appearance of a cooking heater which is a first embodiment of implementation of the invention.

FIG. 1 is a perspective view illustrating the external appearance of a cooking heater. In the interior of a system kitchen 1 is received a cabinet 2. On the upper surface of the cabinet 2 is provided a top plate 3 made of heat-resistant glass corresponding to supporting unit. The top plate 3 is exposed at the upper surface of the system kitchen 1. The top plate 3 is colored to opacity so that the interior of the cabinet 2 cannot be seen through the top plate 3.

In front of the cabinet 2 is provided a control panel 4 provided with an automatic water boiling key 5, a caloric force adjusting dial 6 and a tempura (Japanese deep-fat fried food) key 7. These keys correspond to units of inputting cooking conditions. In this arrangement, control can be made on the front.

On the top plate 3 is formed a circular heating mark 8. The heating mark 8 is colored to a color different from that of the top plate 3 to perform a mark that informs the user of a placing region on which a general-purpose cooking tool (not shown) or a dedicated cooking tool 9 (see FIG. 2) is placed. A window 12 is formed at the right of the heating mark 8 on the top plate 3. The window 12 is a portion where the transparent substrate of the top plate 3 appears and has light-transmitting properties.

Figure 2:
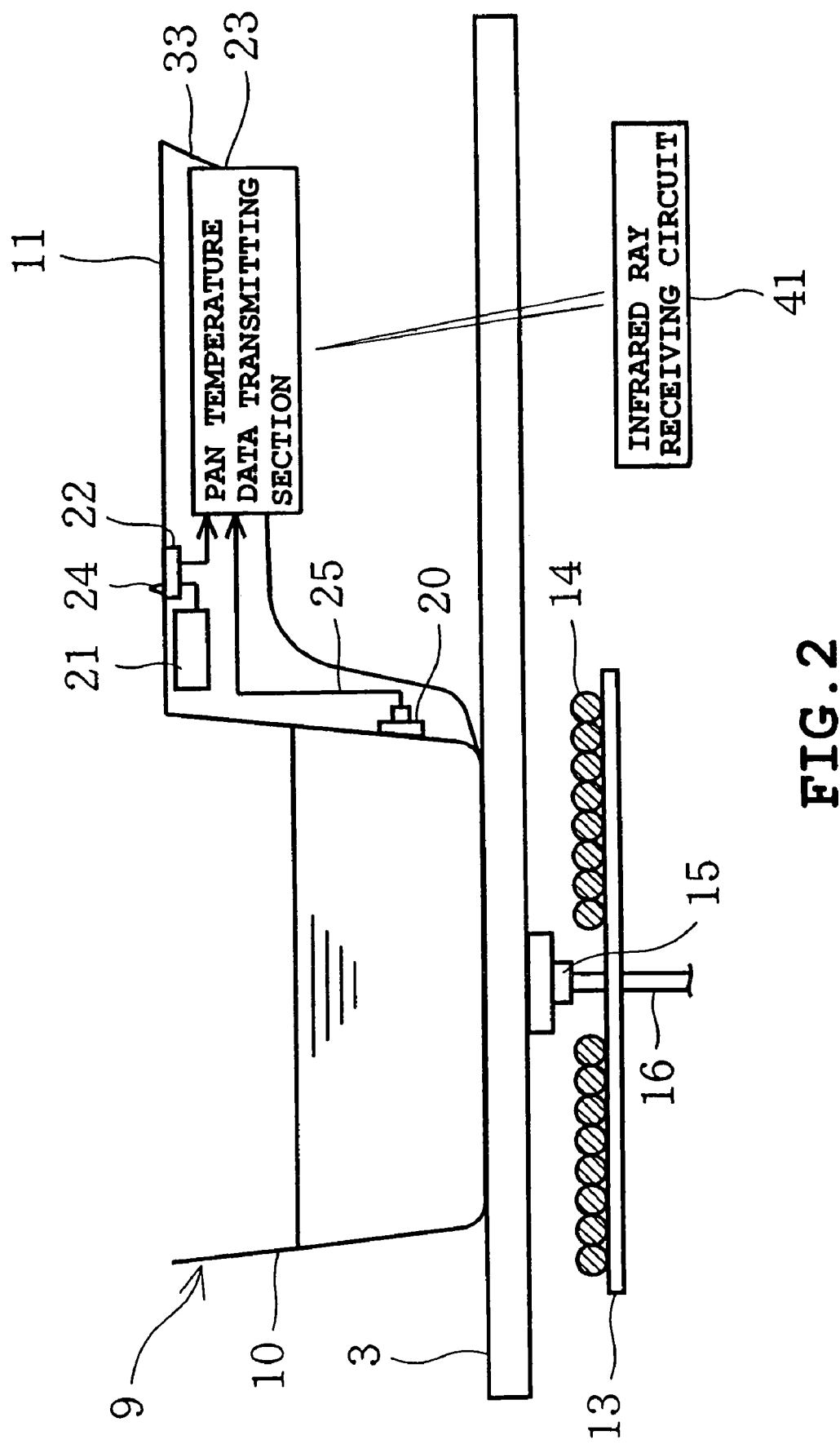
FIG. 2 is a diagram illustrating a dedicated cooking tool set on a top plate.

FIG. 2 illustrates the dedicated cooking tool 9 set at the top plate 3. The dedicated cooking tool 9 is a saucepan made of a magnetic material. The dedicated cooking tool 9 is composed of a container portion 10 in which matters to be cooked are charged and a rod-shaped handgrip portion 11 extending sideward from the container portion 10.

Inside the cabinet 2, an annular coil base 13 is provided under the heating mark 8. To the upper surface of the coil base 13 is fixed an annular IH coil 14 corresponding to heating unit or primary coil. Inside the cabinet 2, an internal temperature sensor 15 is also provided under the heating mark 8. The temperature-sensitive portion of the internal temperature sensor 15 is pressed against the lower surface of the top plate 3 by the spring force of a sensor spring. The internal temperature sensor 15 corresponds to indirect temperature detecting unit, internal temperature detecting unit or temperature detecting unit. The internal temperature sensor 15 has a lead wire 16 extending through the center of the IH coil 14 and the center of the coil base 13. The internal temperature sensor 15 is composed of, e.g., thermistor and is arranged to indirectly detect the surface temperature data of the dedicated cooking tool 9 and the surface temperature data of the general-purpose cooking tool via the top plate 3.

Figure 3:
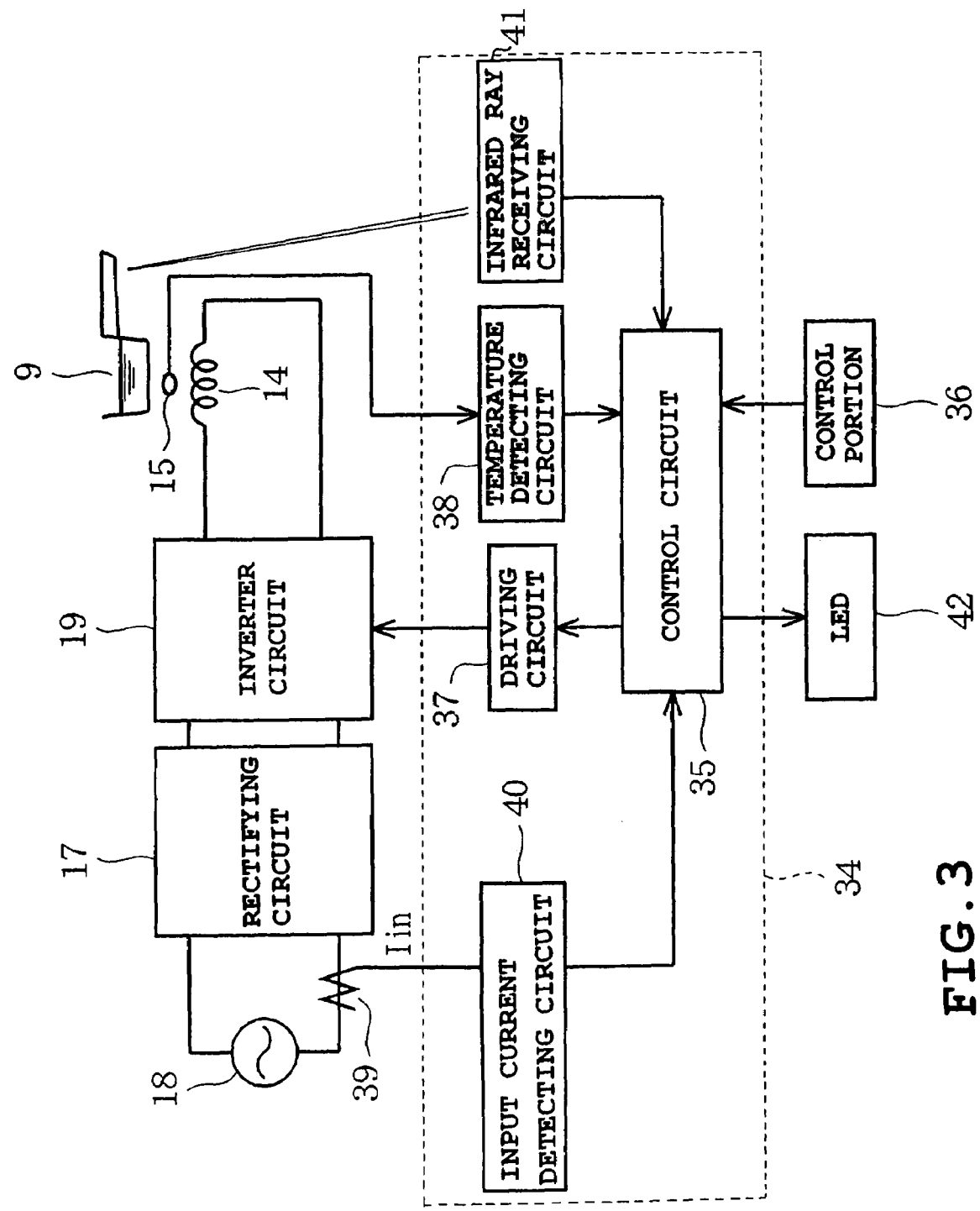
FIG. 3 is a block diagram illustrating the electrical configuration of an inverter circuit portion and an inverter control portion.

FIG. 3 depicts the electrical configuration of an inverter circuit portion and an inverter control portion received in the cabinet 2. The rectifying circuit 17 is composed of a diode bridge circuit and a smoothing capacitor. The rectifying circuit 17 has a commercial AC power supply 18 connected to the input terminal thereof and an inverter circuit 19 connected to the output terminal thereof.

The inverter circuit 19 is mainly composed of switching elements connected in half-bridge configuration. The inverter circuit 19 has an IH coil 14 connected to the output terminal thereof. The IH coil 14 is given a high frequency current from the inverter circuit 19 to make induction-heating of the cooking tool 9.

As shown in FIG. 2, the cooking tool 9 has an external temperature sensor 20 attached thereto at a position close to the lower end of the outer surface (side) of the container portion 10. The reason why the external temperature sensor 20 is attached to the cooking tool 9 at a position close to the lower end of the container portion 10 is that even when the amount of the matters to be cooked received in the container portion 10 is scarce, the temperature of the matters to be cooked can be detected with a high precision through the side wall of the container portion 10. The external temperature sensor 20 corresponds to temperature detecting unit or external temperature detecting unit and is composed of, e.g., thermistor. The temperature-sensitive portion of the external temperature detecting unit comes in close contact with the outer surface of the container portion 10 to make direct detection of the surface temperature data To of the cooking tool 9.

To the handgrip portion 11 of the cooking tool 9 are fixed a pan electric supply 21 and a temperature data transmitting portion 23 corresponding to transmitting unit. The pan electric supply 21 is composed of, e.g., 9 V primary battery and is arranged to supply main electric power Vin to the temperature data transmitting portion 23 through an electric power switch 22. The electric power switch 22 is composed of a self-retained slide switch fixed to the handgrip portion 11 and is mechanically retained ON or OFF by sliding operation of a plunger 24.

The temperature data transmitting portion 23 starts to operate when given a main electric power Vin by the pan electric supply 21 and stops operation when the supply of main electric power Vin is suspended. The temperature data transmitting portion 23 receives a temperature signal from the external temperature sensor 20 through the lead wire 25 and then transmits cooking results including the results of temperature detection (temperature data) in the form of infrared rays. In some detail, the temperature data transmitting portion 23 automatically starts to transmit cooking data when the user switches the electric power switch 22 ON and automatically stops transmission when the user switches the electric power switch 22 OFF.

Figure 4:
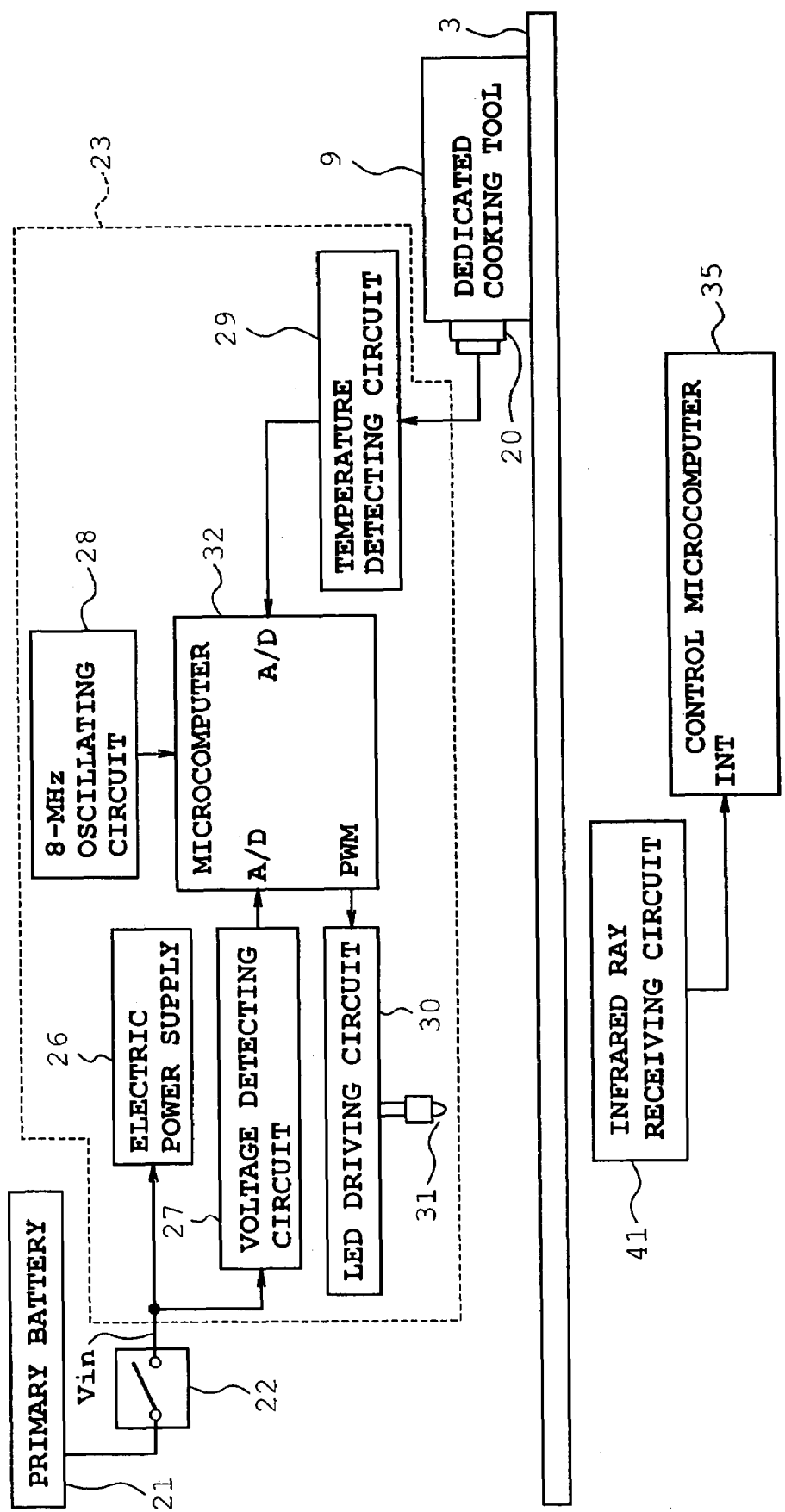
FIG. 4 is a block diagram illustrating the electrical configuration of a temperature data transmitting portion and its peripheral circuits.

FIG. 4 depicts the electrical configuration of the temperature data transmitting portion 23 and its peripheral circuits. The temperature data transmitting portion 23 is composed of an electric power supply 26, a voltage detecting circuit 27, an oscillating circuit 28, a temperature detecting circuit 29, an LED driving circuit 30, an infrared ray LED 31 and a control circuit 32 and is capable of transmitting infrared rays. The temperature data transmitting portion 23 is an infrared ray transmitting module which can be handled as an independent unit. The electric power supply 26 is a series regulator which lowers the main electric power Vin from the pan electric power 21 to produce a stabilized electric power Vo of 5 V. The temperature data transmitting portion 23 operates when it receives this stabilized electric power Vo.

The voltage detecting circuit 27 corresponding to output detecting portion produces a voltage signal corresponding to the level of the main electric power Vin and gives it to the control circuit 32. The temperature detecting circuit 29 to which the external temperature data sensor 20 is connected produces a voltage signal on the level corresponding to the detected temperature and outputs it to the control circuit 32.

The control circuit 32 is composed of a microcomputer comprising CPU, ROM, RAM, I/O, timer circuit, etc. and operates in synchronization with the operating clock of 8 MHz inputted by the oscillating circuit 28. The timer circuit is arranged to output INT signal every a predetermined period of time (e.g., 1 msec). When INT signal from the timer circuit is inputted, CPU reads a control program from ROM to execute 1) voltage detecting process, 2) temperature detecting process, and 3) data transmitting process.

The various processes will be further described hereinafter.

1) Voltage Detecting Process

The voltage detecting process is a process of judging to see if the voltage of the pan electric supply 21 falls to an abnormal level every a predetermined period of time. The control circuit 32 makes A/D conversion of voltage signal inputted from the voltage detecting circuit 27 and then detects the voltage level of the main electric power Vin on the basis of the value obtained by A/D conversion. The control circuit 32 then compares the detected value of voltage level with criterion which has been previously stored in ROM. The control circuit 32 judges that the main electric power Vin is on a normal level when the detected value of voltage level exceeds the criterion and judges that the main electric power Vin is on an abnormal level when the detected value of voltage level falls below the criterion. The term "abnormal level" as used herein is meant to indicate the voltage level at which the control circuit 32 cannot perform normal processing.

2) Temperature Detecting Process

Figure 5:
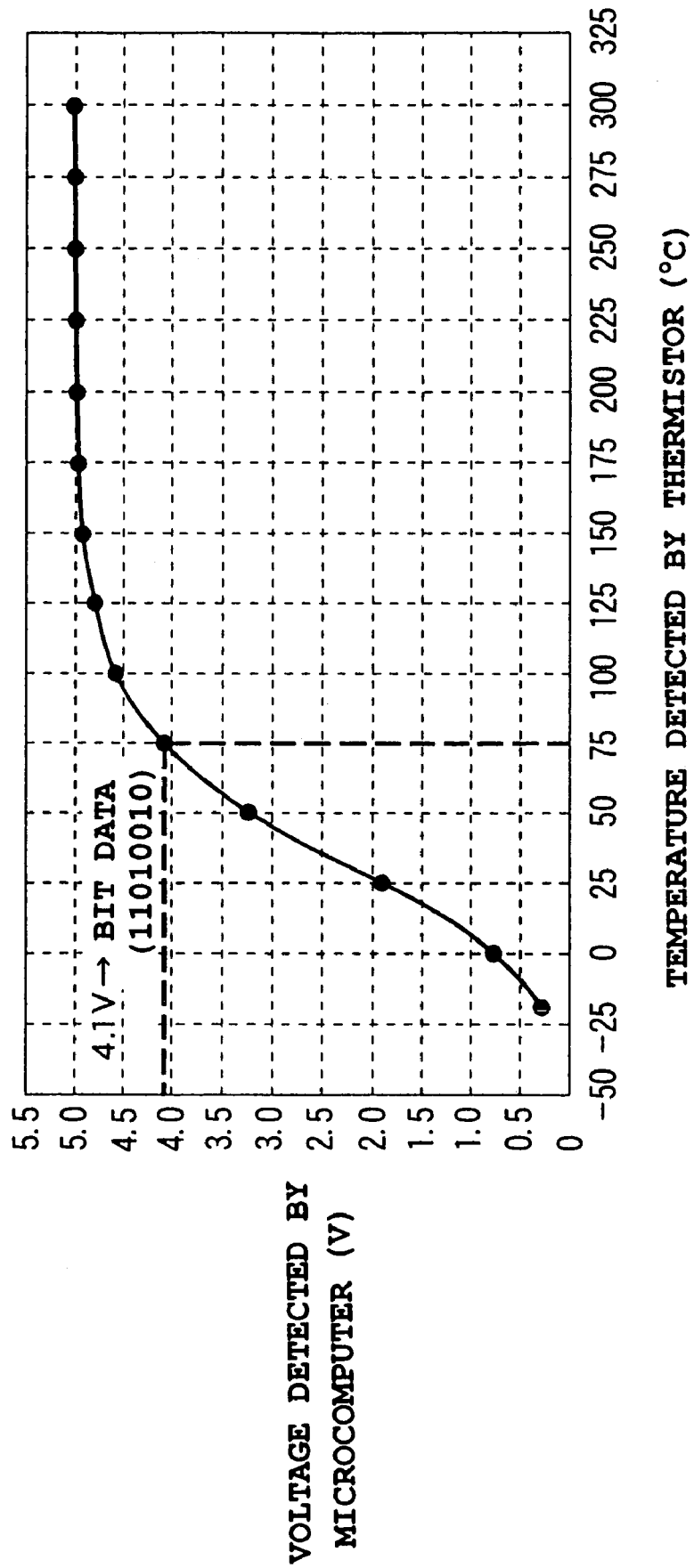
FIG. 5 is a diagram illustrating the relationship between the detected voltage inputted to the control circuit and the detected temperature.

The temperature detecting process is a process of directly detecting the surface temperature To of the cooking tool 9 every a predetermined period of time. ROM in the control circuit 32 has the relationship between the voltage signal (V) from the temperature detecting circuit 29 and the surface temperature To (° C.) of the cooking tool 9 as shown in FIG. 5 stored therein. The control circuit 32 makes A/D conversion of the voltage signal inputted from the temperature detecting circuit 29 and then reads the surface temperature To corresponding to the value obtained by A/D conversion from data stored in ROM. For example, when the voltage signal from the temperature detecting circuit 29 is 4.1 V, the surface temperature To detected is 75° C.

3) Data Transmitting Process

As shown in FIG. 4, the control circuit 32 has an infrared LED 31 corresponding to infrared ray element connected thereto via LED driving circuit 30. The data transmitting process is a process of producing a driving signal for infrared LED 31 to control emission from the infrared LED 31 and then transmitting cooking data in the form of infrared rays. This data transmitting process is executed every a predetermined period of time in synchronization with the aforementioned voltage detecting process and temperature detecting process.

In some detail, the control circuit 32 produces a driving signal on the basis of the aforementioned results of detection of power voltage Vin and surface temperature To and drive-controls the LED driving circuit 30 according to the driving signal. In this manner, the infrared LED 31 transmits cooking data including the results of detection of power voltage Vin and surface temperature To in the form of infrared rays. The driving signal is produced by modulating a carrier signal having predetermined frequency (e.g., 31.25 kHz) and duty ratio. The modulation of the carrier signal is carried out by varying ON-OFF period.

Figure 6A:
FIG. 6A is a diagram illustrating a driving signal for infrared LED.
Figure 6B:
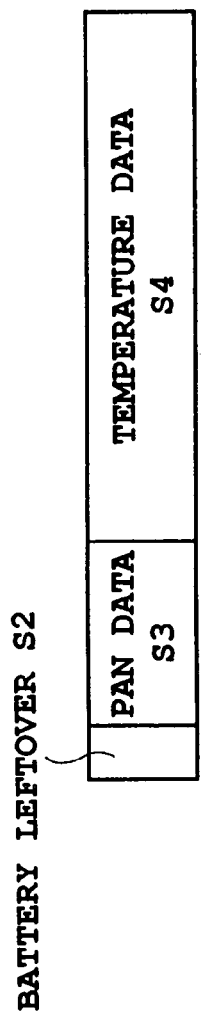
FIG. 6B is a diagram illustrating the contents of wireless cooking data emitted by the infrared LED.

FIGS. 6A and 6B each depict a driving signal S produced by the control circuit 32. The driving signal S is composed of header S1, battery leftover data S2, pan data S3, temperature data S4 and stop bit S5. The header S1 indicates the beginning of transmission of driving signal. The header S1 is produced by switching the carrier signal ON for 5 msec and OFF for 3 msec. The stop bit S5 indicates the end of transmission of driving signal. The stop bit S5 is produced by switching the carrier signal ON for 1 msec and OFF for 3 msec or more. The battery leftover data S2, the pan data S3 and the temperature data S4 each are produced by combining bit "0" and bit "1". The bit "0" is produced by switching the carrier signal ON for 1 msec and OFF for 1 msec. The bit "1" is produced by switching the carrier ON for 1 msec and OFF for 2 msec.

The battery leftover data S2 is composed of 1 bit data indicating whether or not the pan electric supply 21 has consumed electric power. When it is judged at the voltage detecting process that the main electric power Vin is on a normal level, CPU of the control circuit 32 then sets the battery leftover data S2 to "0" at the subsequent data transmitting process. On the contrary, when it is judged that the main electric power Vin is on an abnormal level, CPU of the control circuit 32 then sets the battery leftover data S2 to "1" at the subsequent data transmitting process.

The pan data S3 is an inherent data indicating the kind, material, size and other factors of the cooking tool 9 which is previously stored in ROM of the control circuit 32. The pan data S3 is composed of 3 bit data. CPU of the control circuit 32 sets the pan data S3 to data stored in ROM every data transmitting process.

The temperature data S4 is composed of 8 bit data indicating the surface temperature of the cooking tool 9. CPU of the control circuit 32 sets the detected value To obtained at the temperature detecting process to temperature data S4 at the subsequent data transmitting process. For example, when the detected value To obtained at the temperature detecting process is 75° C., "11010010" is set as temperature data S4.

The cooking tool 9 has a handgrip cover 33 attached thereto as shown in FIG. 2. The hand grip cover 33 is formed by an insulating material. The handgrip cover 33 covers the external temperature sensor 20, the pan electric supply 21, the electric supply switch 22, the temperature data transmitting portion 23 and the lead wire 25 except the plunger 24. The handgrip cover 33 has a battery replacement port formed therein for replacement of the pan electric supply 21. The battery replacement port has a battery cover attached thereto in such an arrangement that the battery cover can be opened and closed. The aforementioned insulating material is made of a material having a lower heat conductivity than the magnetic material which is the substrate of the cooking tool 9 (e.g., synthetic resin).

The cabinet 2 has an inverter control portion 34 shown in FIG. 3 received therein. The inverter control portion 34 is adapted to perform switching control of the inverter circuit 19. The configuration of the inverter control portion 34 will be described hereinafter.

The control circuit 35 corresponding to control unit is mainly composed of microcomputer comprising CPU, ROM, RAM, I/O, etc. The control circuit 35 has a control portion 36 connected thereto. The control portion 36 comprises cooking data inputting units, including automatic water boiling key 5, calorific force dial 6, tempura key 7. The control circuit 35 is adapted to predetermine cooking conditions according to the contents of control given by the control portion 36 and produce a driving signal on the basis of the cooking conditions.

The driving circuit 37 is adapted to perform switching-control of the inverter circuit 19 on the basis of the driving signal from the control circuit 35.

The internal temperature sensor 15 has a temperature detecting circulation 38 connected thereto via a lead wire 16. The control circuit 35 is adapted to detect the surface temperature of the cooking tool 9 or the surface temperature Ts of general-purpose cooking tool by performing A/D conversion of the voltage signal from the temperature detecting circuit 38 and control the pulse width of the driving signal on the basis of the surface temperature To or Ts thus detected.

The current transformer 39 is a current detecting unit of detecting the input current Iin from the AC supply 18 to the rectifying circuit 17. The input current detecting circuit 40 is adapted to output a voltage signal on the level corresponding to the input current Iin detected by the current transformer 39. The control circuit 35 is adapted to detect the magnitude of the input current Iin by performing A/D conversion of the voltage signal from the input current detecting circuit 40.

The control circuit 35 is adapted to detect the electric energy (integrated wattage) used in induction heating by integrating the detected value of input current Iin and obtain heating data by performing software processing of the detected value of electric energy and the detected value of surface temperature Ts. There is a constant relationship between the detected value of surface temperature Ts and the electric energy. The control circuit 35 is also adapted to obtain heating data such as material, weight and size of general-purpose cooking tool on the basis of the relationship between the both factors and control the pulse width of the driving signal on the basis of the heating data (caloric force control).

The process of obtaining heating data on the basis of the detected value of input current Iin is executed during general-purpose automatic water boiling free from infrared cooking data from the temperature data transmitting portion 23. On the contrary, during dedicated automatic water boiling with infrared cooking data from the temperature data transmitting portion 23, heating data on the cooking tool 9 are obtained on the basis of pan data S3 which are cooking data. The pulse width of the driving signal is controlled on the basis of the heating data.

Figure 6C:
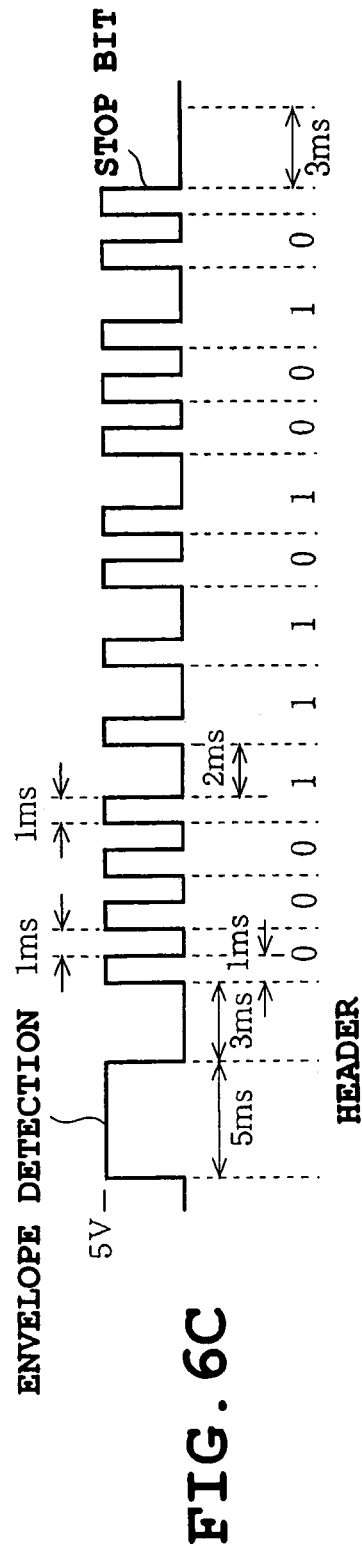
FIG. 6C is a diagram illustrating a signal obtained by detecting wireless cooking data outputted from an infrared ray receiving circuit.

The infrared ray receiving circuit 41 corresponding to receiving unit is composed of modularized infrared ray sensor and signal outputting circuit. The infrared ray receiving circuit 41 is disposed under the window portion 12 of the top plate 3. The infrared ray receiving circuit 41 is adapted to produce cooking data by receiving cooking data from the temperature data transmitting portion 23 through the window portion 12. The cooking data are obtained by envelope-detecting the received signal of cooking data as shown in FIG. 6C.

As shown in FIG. 4, the infrared ray receiving circuit 41 is connected to the interrupting terminal INT of the control circuit 35. The control circuit 35 is adapted to start interruption program when the header S1 of the cooking data is detected and store battery leftover data S2, pan data S3 and temperature data S4 following the header S1 in RAM as wireless cooking data. RAM has a "wireless area (NEW)" and a "wireless area (OLD)" formed therein as storing area for wireless cooking data. The newest wireless cooking data from the infrared ray receiving circuit 41 are stored in "wireless area (NEW)" by the execution of interruption program, processed by a main program for automatic water boiling, and then transferred to "wireless area (OLD)".

ROM of the control circuit 35 has a main program for automatic water boiling stored therein. When the automatic water boiling key 5 is switched ON, CPU of the control circuit 35 starts the main program for automatic water boiling to perform heating control.

The control circuit 35 also has LED 42 corresponding to informing unit connected thereto as shown in FIG. 3. During heating control, CPU of the control circuit 35 causes LED 42 to emit light continuously when bit "1" indicating the consumption of the pan electric supply 21 is stored in "wireless area (NEW)" of RAM as battery leftover data S2. In this manner, the user is informed of consumption of necessity of replacement of the pan electric supply 21. LED 42 is provided on the control panel 4 as shown in FIG. 1.

The main program for automatic water boiling will be further described in connection with FIGS. 7 and 8.

In order to perform automatic water boiling using a general-purpose cooking tool, the general-purpose cooking tool is set on the heating mark 8. The automatic water boiling key 5 on the control panel 4 is then switched ON. On the contrary, in order to perform automatic water boiling using a dedicated cooking tool 9, the dedicated cooking tool 9 is set on the heating mark 8. The electric switch 22 on the cooking tool 9 and the automatic water boiling key 5 on the control panel 4 are then switched ON.

Figure 7:
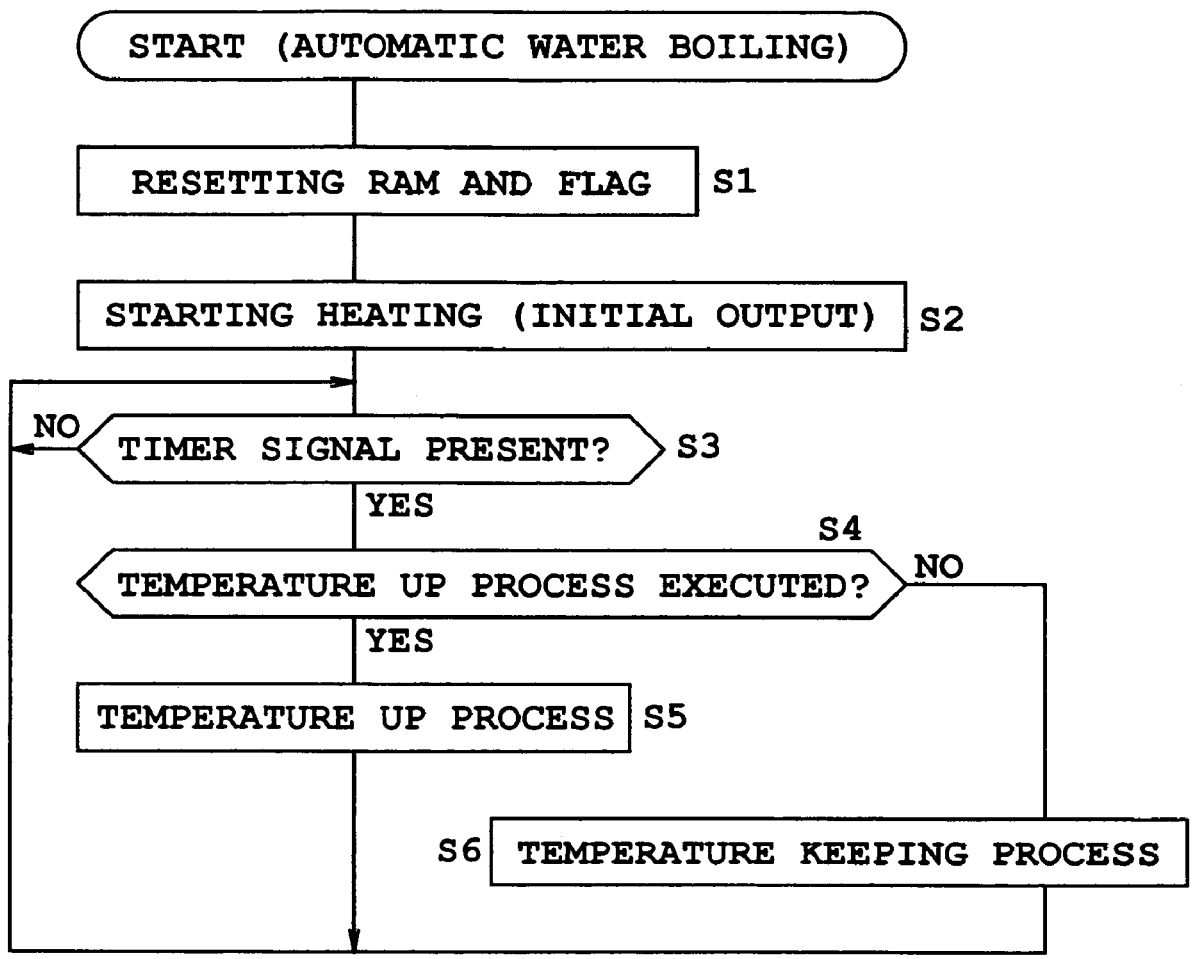
FIG. 7 is a flow chart illustrating the contents of processing of automatic water-boiled cooking.

FIG. 7 is a flow chart illustrating the contents of automatic water boiling process.

When it is detected that the automatic water boiling key 9 has been switched ON, the control circuit 35 clears RAM at Step S1 and sets the cooking flag to temperature rising process. Subsequently, at Step 2, the caloric force is set to 3 kW which is a rated value. Automatic water boiling then starts with a high caloric force. The caloric force is adjusted by controlling the energization time for IH coil 14 per unit time with ON-OFF ratio of the switching element constituting the inverter circuit 19.

Thereafter, the operation of the control circuit 35 moves to Step S3 where it is then judged to see if timer signal is present. The timer signal is outputted from the timer circuit of the control circuit 35 every a predetermined period of time (e.g., 1 sec). The operation of the control circuit 35 moves to Step S4 when timer signal is detected at Step S3.

The control circuit 35 judges the set conditions of cooking flag at Step S4. The cooking flag is set to temperature rising process at the start of automatic water boiling and is set to temperature keeping at the end of temperature rising process. The control circuit 35 is adapted to execute the temperature rising process at Step S5 when the cooking flag is set to temperature rising process and execute temperature keeping process at Step S6 when the cooking flag is set to temperature keeping process. Thus, temperature rising process at Step S5 and temperature keeping process at Step S6 are executed every time the timer signal is outputted from the timer circuit.

Figure 8:
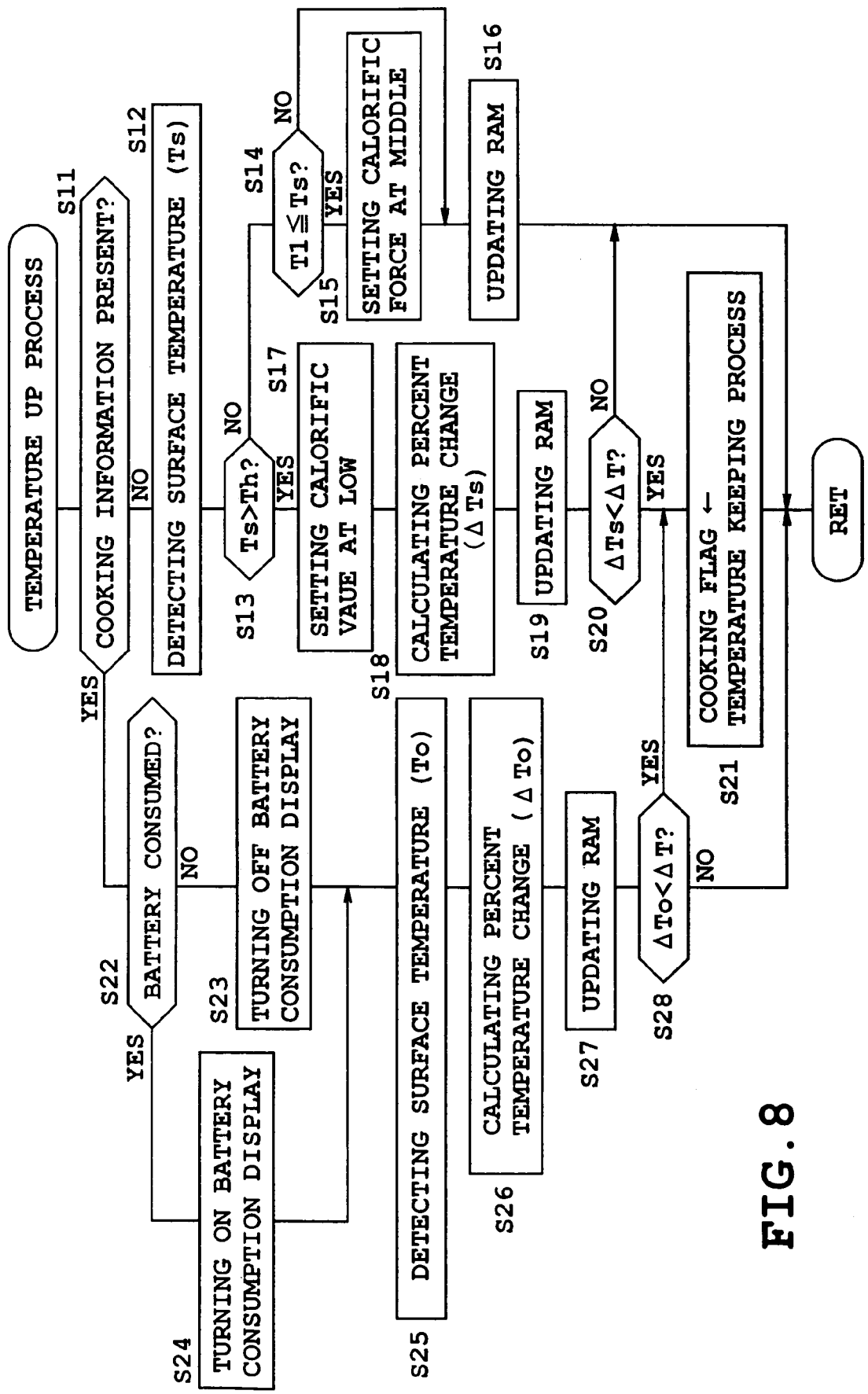
FIG. 8 is a flow chart illustrating the content of processing of heating.

FIG. 8 is a flow chart illustrating the contents of temperature rising process.

When the process moves to temperature rising process at Step S5, the control circuit 35 refers to "wireless area (NEW)" in RAM. This "wireless area (NEW)" indicates the newest working conditions of the dedicated cooking tool 9. When a general-purpose cooking tool is in use, the "wireless area (NEW)" is in reset state. In the case where "wireless area (NEW)" is in reset state, the operation of the control circuit 35 moves to Step S12 where general-purpose water boiling is performed.

The general-purpose water boiling and the dedicated water boiling will be described hereinafter separately of each other.

1. General-Purpose Water Boiling

At Step S12, the control circuit 35 detects the surface temperature Ts of the cooking tool on the basis of the output signal obtained from the internal temperature sensor 15 through a wire system and store the detected results in RAM as wired-carried cooking data. RAM comprises "wire area (NEW)" and "wire area (OLD)" provided therein as housing area for wire-carried cooking data. The newest surface temperature Ts obtained at Step S12 is stored in "wire area (NEW)" and then transferred to "wire area (OLD)" at Step 16 or Step S19 described later.

Subsequently, the process of the control circuit 35 moves to Step S13 where the surface temperature Ts is then compared with criterion Th (e.g., 80° C.) stored in ROM. When it is judged that Ts is not greater than Th, the process of the control circuit 35 moves to Step S14 where the surface temperature Ts is compared with criterion Tl (e.g., 50° C.) stored in ROM.

When it is judged that Ts is smaller than Tl at Step S14, the process of the control circuit 35 moves to Step S16 where the newest surface temperature Ts stored in "wire area (NEW)" is moved to "wire area (OLD)" and default data are stored in "wire area (NEW)" to reset "wire area (NEW)".

On the other hand, when it is judged that Tl is not greater than Ts at Step S14, the caloric force is set to 2 kW at Step S15. The process of the control circuit 35 then moves to Step S16. In some detail, when it is detected from the output signal from the internal temperature sensor 15 that the surface temperature Ts of the general-purpose cooking tool has reached criterion Tl, the control circuit 35 lowers the caloric force from 3 kW to a middle value of 2 kW at which the cooking tool is then continuously heated.

When it is judged at Step S13 that Ts is greater than Th, the process of the control circuit 35 then moves to Step S17 at which IH coil 14 is then operated to give a low caloric force of 1 kW. In some detail, when it is detected from the output signal from the internal temperature sensor 15 that the surface temperature Ts of the general-purpose cooking tool has reached criterion Th (>Tl), the control circuit 35 lowers the caloric force from 2 kW to a low value of 1 kW at which the cooking tool is then continuously heated.

When the caloric force is set to a low value at Step S17, the control circuit 35 calculates the percent temperature change ΔTs at Step S18. The percent temperature change ΔTs is the change of temperature of the cooking tool per unit time. The control circuit 35 reads the surface temperature Ts from "wire area (NEW)" and "wire area (OLD)" and then calculates the percent temperature change ΔTs from the difference between the newest detected value of surface temperature Ts and the last detected value of surface temperature Ts.

Thereafter, the process of the control circuit 35 moves to Step S19 at which the surface temperature Ts in "wire area (NEW)" is transferred to "wire area (OLD)" and default data are written in "wire area (NEW)" to reset "wire area (NEW)" (updating process).

When "wire area (NEW)" and "wire area (OLD)" in RAM are updated at Step S19, the control circuit 35 compares the percent temperature change ΔTs calculated at Step S20 with criterion ΔT previously stored in ROM. When the comparison shows that ΔTs is smaller than ΔT, it is then judged that the surface temperature of the cooking tool has reached water boiling recognition temperature Tw. The process of the control circuit 35 then moves to Step S21 at which the temperature keeping process is then set at the cooking flag.

Figure 10:
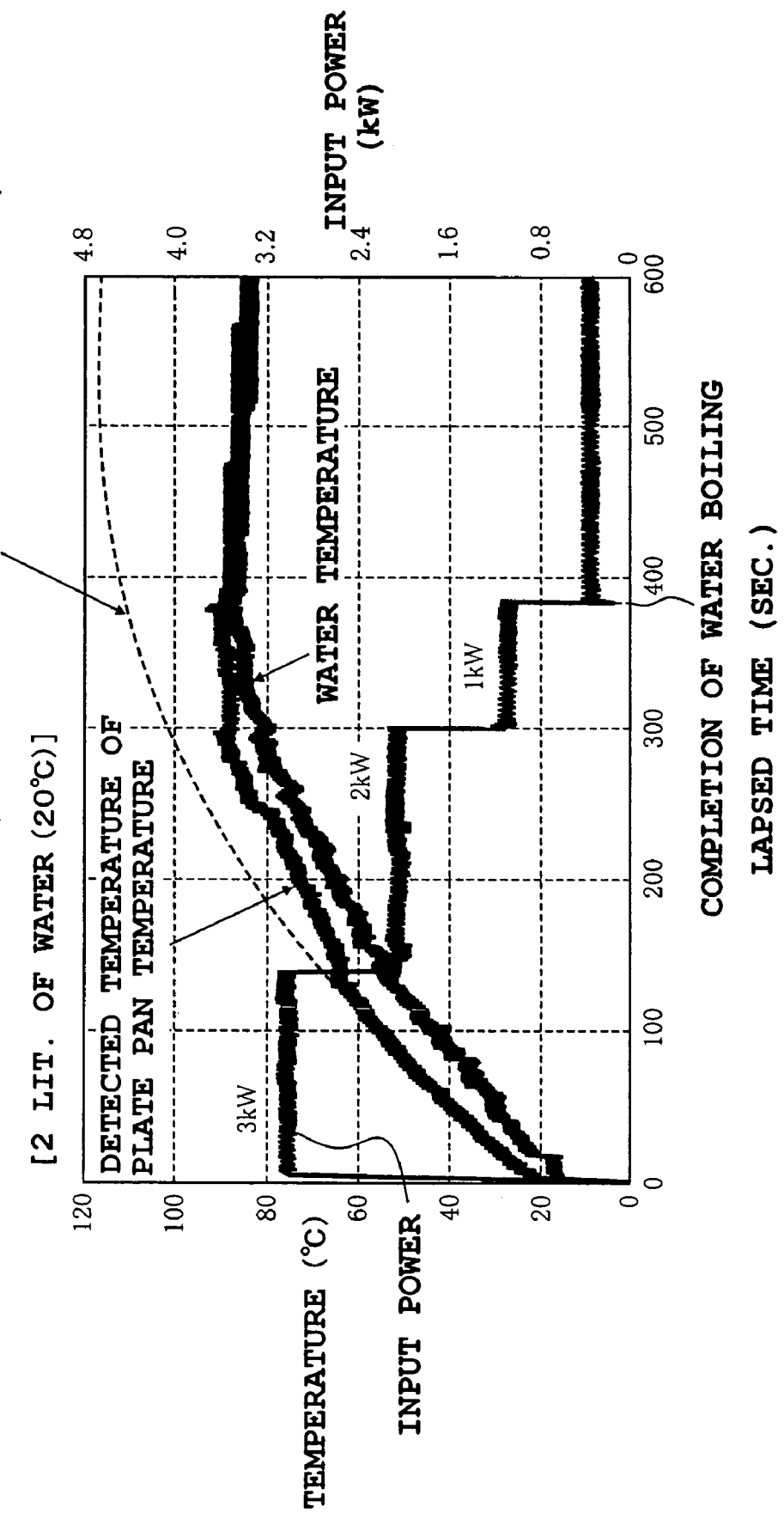
FIG. 10 is a diagram illustrating the change of temperature and input electric power in the contents of automatic water-boiled cooking using a general-purpose cooking tool.

In some detail, as shown in FIG. 10, the general-purpose automatic water boiling process comprises changing stepwise the caloric force from high value to low value via middle value according to the output signal from the internal temperature sensor 15 to stepwise lower the heated state of the cooking tool. The general-purpose automatic water boiling process ends when it is detected that the temperature rise ΔTs of the cooking tool has slowed down.

2. Dedicated Water Boiling Process

When it is detected at Step S11 of FIG. 8 that wireless cooking data are stored in "wire area (NEW)" in RAM, the process of the control circuit 35 then moves to Step S22. The wireless cooking data are transmitted by the temperature data transmitting portion 23 of the cooking tool 9 in the form of infrared rays every a predetermined period of time. The control circuit 35 takes the wireless cooking data therein in an external interruption process. In some detail, when the dedicated cooking tool 9 is in use, wireless cooking data are stored in "wireless area (NEW)". The control circuit 35 then performs an automatic water boiling process suitable for dedicated cooking tool 9.

At Step S22, the control circuit 35 reads battery leftover data S2 from "wireless area (NEW)". When the battery leftover data S2 is "0", it is then judged that the pan electric supply 21 is on a normal level. LED 42 is then extinguished at Step S23. On the other hand, when the battery leftover data S2 is "1", it is then judged that the pan electric supply 21 has been abnormally lowered down. The process of the control circuit 35 then moves to Step S24 at which LED 41 is then turned ON to inform the user of consumption of the battery. The battery consumption display is turned ON when the pan electric supply 21 is abnormally lowered down in the course of cooking, not to mention when cooking is started while the pan electric supply 21 is in abnormally low state. However, when the pan electric supply 21 is replaced by a normal one in the course of cooking, the battery leftover data S2 transmitted by the temperature data transmitting portion 23 turns to "0" to turn the battery consumption display OFF.

Subsequently, the process of the control circuit 35 moves to Step S25 at which the temperature data S4 is then read out from "wireless area (NEW)" in RAM. The temperature data S4 is the surface temperature To of the cooking tool 9 transmitted by the temperature data transmitting portion 23 in the form of infrared rays. At Step S26, the control circuit 35 then calculates the percent temperature change ΔTo. The percent temperature change ΔTo is the change of temperature of the cooking tool 9 per unit time. The control circuit 35 reads the surface temperature To from "wireless area (NEW)" and "wireless area (OLD)" and then calculates the percent temperature change ΔTo from the difference between the newest detected value of surface temperature To and the last detected value of surface temperature To.

Thereafter, the process of the control circuit 35 moves to Step S27 at which the surface temperature To in "wireless area (NEW)" is transferred to "wireless area (OLD)" and default data are then written in "wireless area (NEW)" to reset "wireless area (NEW)" (updating process).

When "wireless area (NEW)" and "wireless area (OLD)" in RAM are updated at Step S27, the control circuit 35 then compares the calculated percent temperature change ΔTo with criterion ΔT previously stored in ROM at Step S28. When the comparison shows that ΔTo is smaller than ΔT, it is then judged that the surface temperature of the cooking tool 9 has reached the water boiling recognition temperature Tw. The process of the control circuit 35 then moves to Step S21 at which the temperature keeping process is then set at the cooking flag.

Figure 9:
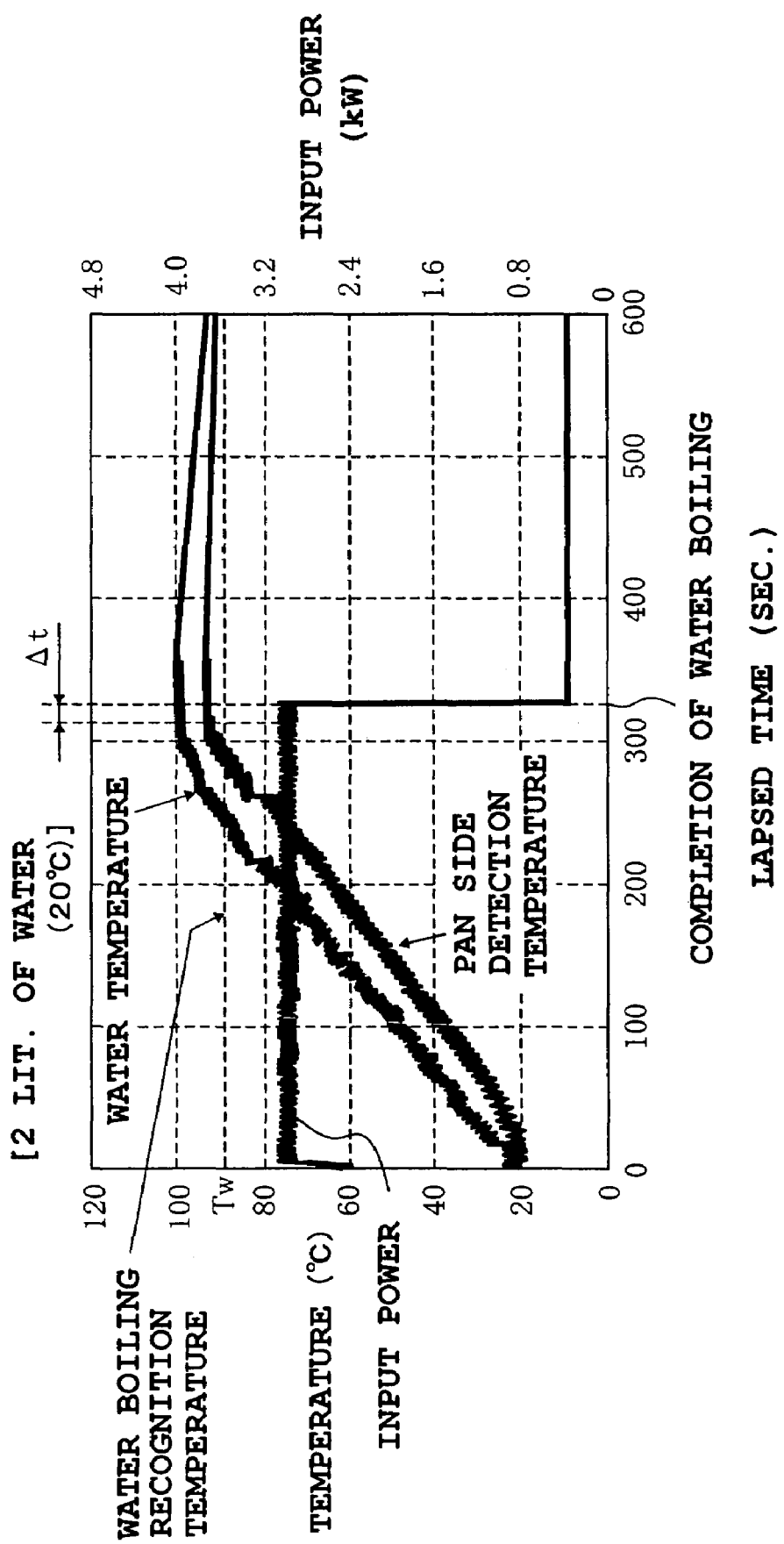
FIG. 9 is a diagram illustrating the change of temperature and input electric power in automatic water-boiled cooking using a dedicated cooking tool.

In some detail, as shown in FIG. 9, the dedicated water boiling process comprises detecting directly the surface temperature To while heating the cooking tool 9 with a high caloric force of 3 kW. The dedicated water boiling process ends when it is detected that the temperature rise Δto of the cooking tool has slowed down.

When it is judged at Step S11 that there are no wireless cooking data in "wireless area (NEW)" during the dedicated automatic water boiling process, the control circuit 35 then switches the process to general-purpose cooking process. For example, when the pan electric supply 21 lowers down to level at which the process can no longer be controlled during the dedicated water boiling process, there are no wireless cooking data from the temperature data transmitting portion 23. Thus, the process is switched from dedicated water boiling process to general-purpose water boiling process.

When it is detected at Step S4 of FIG. 7 that the cooking flag is set to the temperature keeping process, the control circuit 35 then sets the caloric force to a value for temperature keeping (<1 kW) at the temperature keeping process of Step S6. When there are wireless cooking data, the caloric force is then adjusted to a range close to the value for temperature keeping such that the wireless surface temperature To is kept at the water boiling recognition temperature Tw. On the contrary, when there are no wireless cooking data, the caloric force is then adjusted to a range close to the value for temperature keeping such that the wire surface temperature Ts is kept at the water boiling recognition temperature Tw.

In accordance with the first embodiment described above, the external temperature sensor 20 is directly attached to the cooking tool 9. By wireless-communicating cooking data including detected temperature (temperature data) given by the external temperature sensor 20, heating control is made. In this manner, the sensor is not subject to the effect of magnetic field from IH coil 14, etc. Further, there is no necessity of providing a top plate 3 causing temperature gradient. Accordingly, the actual temperature of the cooking tool 9 can be detected with a high precision. As a result, the cooking tool 9 can be continuously heated with a high caloric force, making it possible to finish the cooking of matters to be cooked as desired in a short period of time.

The first embodiment is also characterized by the use of infrared rays as transmitting medium. Infrared rays can be transmitted over a wide range, the cooking data in the form of infrared rays can certainly reach the infrared ray receiving circuit 41 regardless of the disposition of the cooking tool on the heating mark 8. Further, since infrared rays are not subject to the effect of magnetic field, the cooking data in the form of infrared rays cannot be affected by the magnetic field from IH coil 14.

The first embodiment is further characterized by the use of a battery as pan electric supply 21. In this arrangement, there is no necessity of supply electric power from the heat cooking tool side, making it possible to simplify the electrical configuration.

The abnormal drop of the output of the pan electric supply 21 is detected on the heat cooking tool side. In this arrangement, the user can be urged to replace the pan electric supply 21 before the occurrence of any troubles in the transmission of cooking data in the form of infrared rays, making it possible to enhance maintenance.

The internal temperature sensor 15 is provided on the heat cooking tool side. The working state of the internal temperature sensor 15 is controlled according to the state of transmitting cooking data in the form of infrared rays. In this arrangement, whenever the pan electric supply 21 lowers down in the course of cooking to stop the transmission of cooking data in the form of infrared rays in the course of cooking, cooking can be continued on the basis of the results of detection from the internal temperature sensor 15. Further, when the pan electric supply 21 is replaced in the course of cooking to restore the transmission of cooking data in the form of infrared rays, cooking can be continued on the basis of the results of temperature data transmitted in the form of infrared rays.

The temperature data transmitting portion 23 is composed of infrared ray transmitting module and thus can be easily attached to the cooking tool 9.

Embodiment 2

Figure 13:
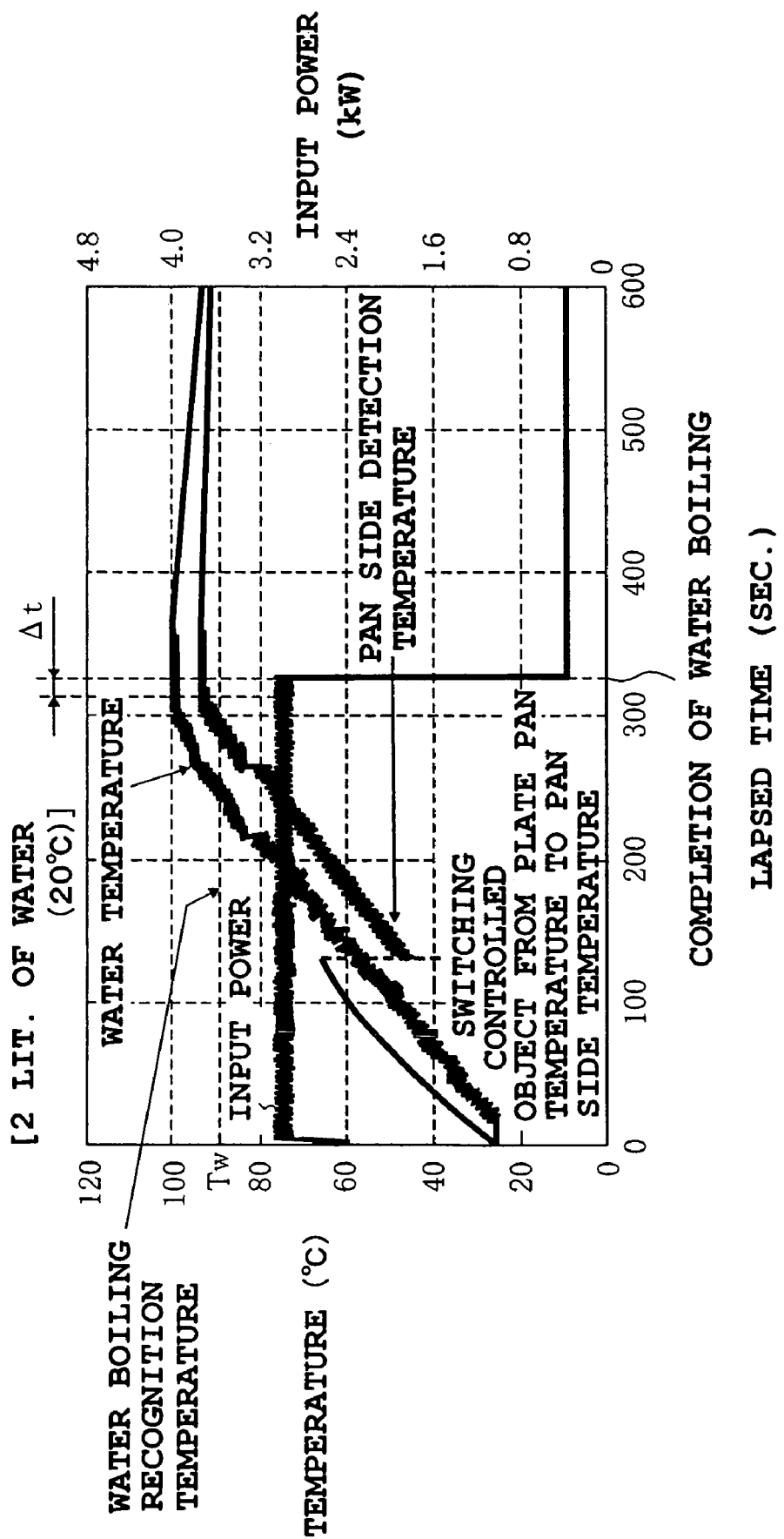
FIG. 13 is a diagram illustrating the change of temperature and input electric power in automatic water-boiled cooking using a dedicated cooking tool.

A second embodiment of implementation of the invention will be described in connection with FIGS. 11 and 13.

Figure 11:
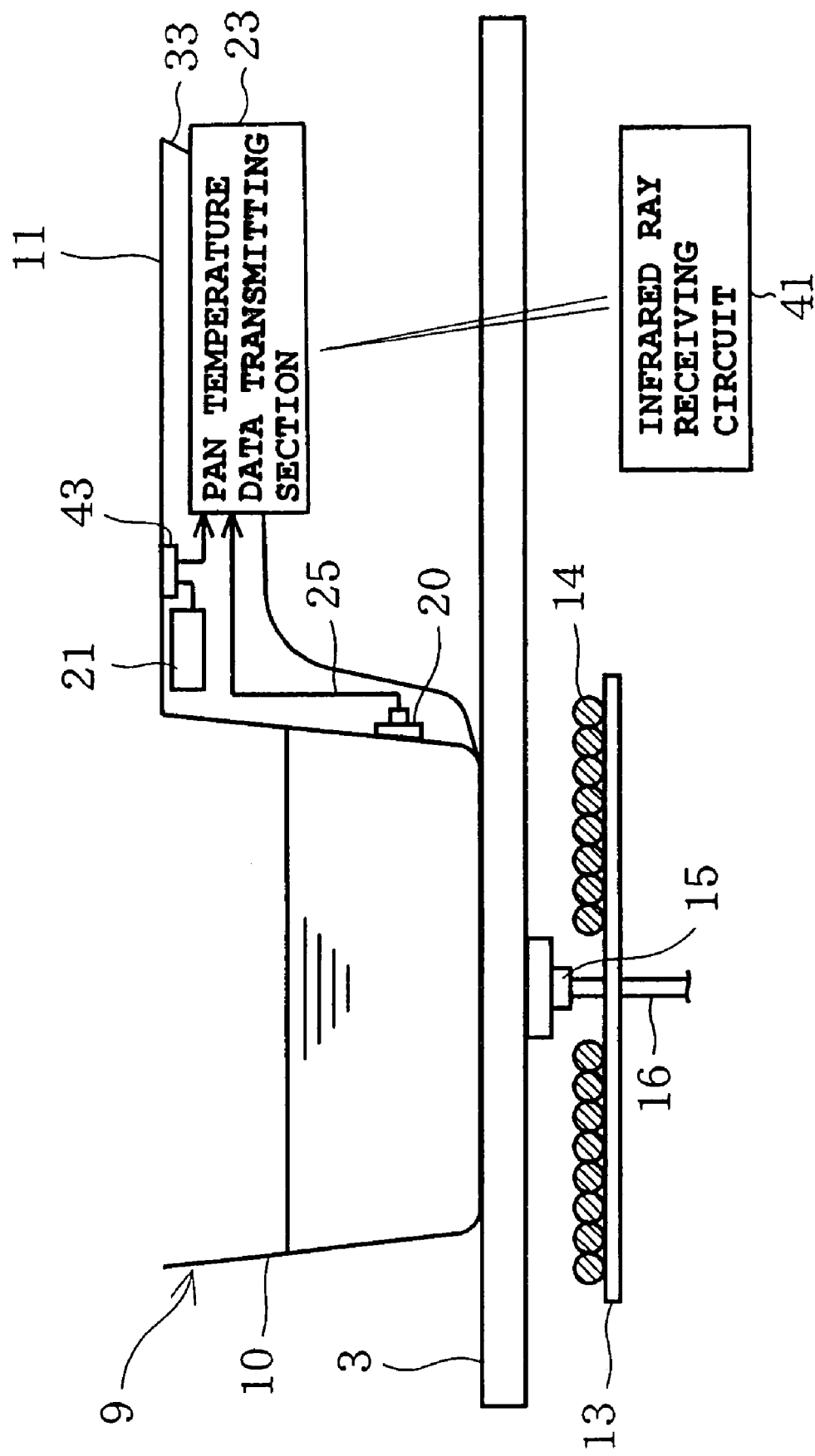
FIG. 11 is a diagram illustrating a dedicated cooking tool set at a top plate according to a second embodiment of implementation of the invention.
Figure 12:
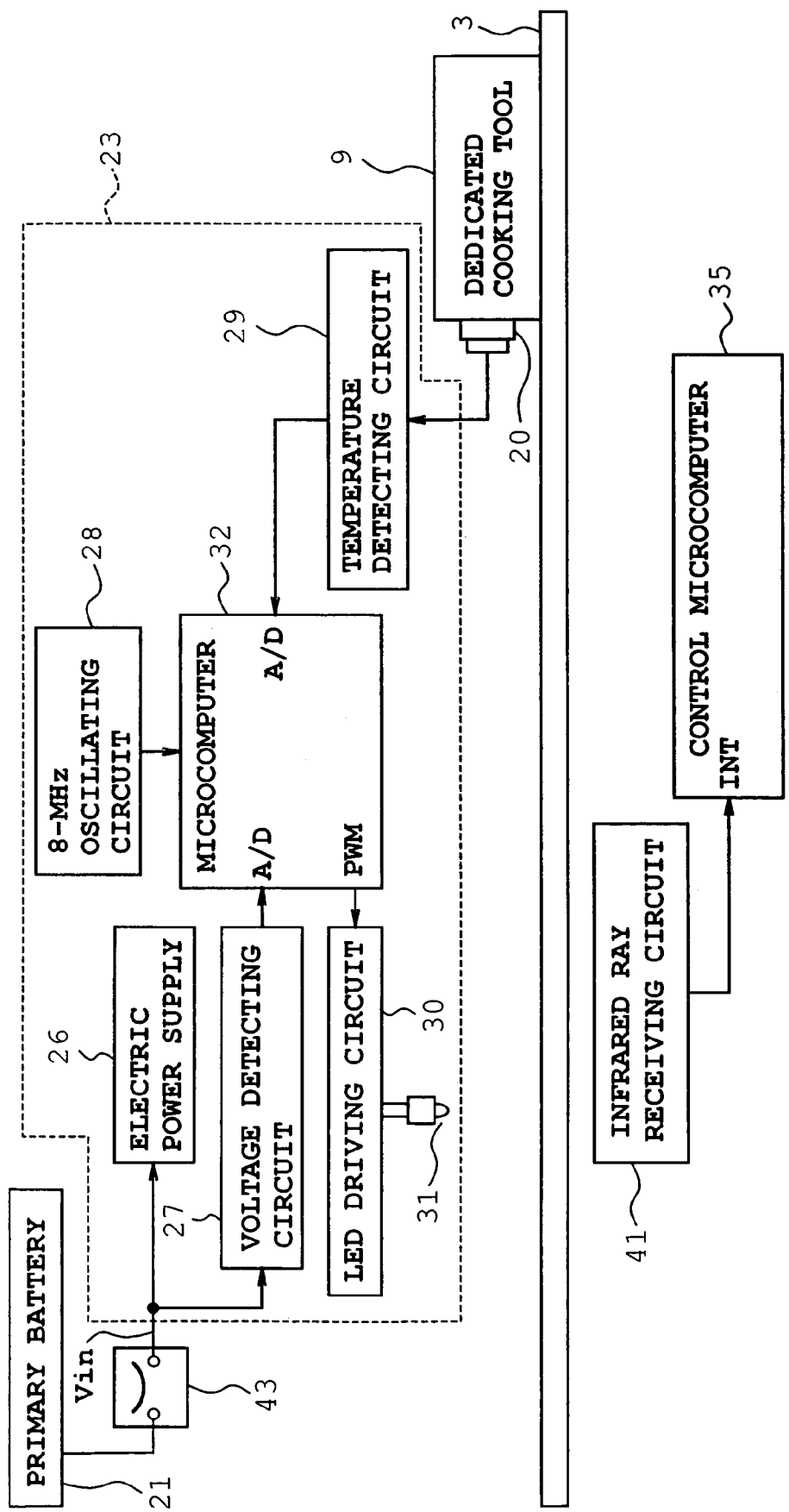
FIG. 12 is a block diagram illustrating the electrical configuration of a temperature data transmitting portion and its peripheral circuits.

FIG. 11 depicts a dedicated cooking tool 9 set on a top plate 3. FIG. 12 depicts the electrical configuration of a temperature data transmitting portion 23 and its peripheral circuits.

The handgrip 11 of the dedicated cooking tool 9 has a temperature switch 43 provided in a handgrip cover 33 as a switching unit. The pan electric supply 21 is connected to an electric supply circuit 26 via the temperature switch 43. The temperature switch 43 has a bimetal as a moving contact. The temperature switch 43 switches ON or OFF across the detected temperature Tb as a border. In some detail, when the surface temperature To of the cooking tool 9 is not greater than the detected temperature Tb, the temperature switch 43 switches OFF to deenergize the temperature data transmitting portion 23. On the contrary, when the surface temperature To of the cooking tool 9 exceeds the detected temperature Tb, the temperature switch 43 switches ON to energize the temperature data transmitting portion 23. Accordingly, the temperature data transmitting portion 23 starts to transmit cooking data in the form of infrared rays under the conditions that the surface temperature To of the cooking tool 9 exceeds the detected temperature Tb.

The control circuit 35 of the inverter control portion 34 controls automatic water boiling process according to the control program shown in FIGS. 7 and 8. In some detail, since there are no wireless cooking data before the reach of the surface temperature To to the detected temperature Tb even when the dedicated cooking tool 9 is in use, general-purpose cooking process is performed. When the surface temperature To of the cooking tool 9 exceeds the detected temperature Tb, there are wireless cooking data. Thus, dedicated cooking process is performed. The detected temperature Tb is predetermined to be smaller than criterion T1 for general-purpose water boiling (e.g., 45° C.). Accordingly, the transmission of cooking data in the form of infrared rays from the temperature data transmitting portion 23 begins before the detection of the state "T1≦Ts" at Step S14 of FIG. 8. At Step S15, the process is switched from general-purpose cooking process to dedicated cooking process before the switching of the caloric force from a high value of 3 kW to a middle value of 2 kW. In some detail, the cooking tool 9 is continuously heated with the initial high caloric force until the water boiling recognition temperature Tw is reached as shown in FIG. 13.

In accordance with the second embodiment, the pan electric supply 21 supplies electric power to the temperature data transmitting portion 23 according to the surface temperature To of the cooking tool 9. In this arrangement, only when the region where the surface temperature To of the cooking tool 9 needs to be detected is accessed, the pan electric supply 21 supplies electric power to the temperature data transmitting portion 23 to cause the temperature data transmitting portion 23 to transmit cooking data in the form of infrared rays, making it possible to suppress the consumption of the pan electric supply 21.

Embodiment 3

A third embodiment of implementation of the invention will be described in connection with FIGS. 14 to 16.

Figure 14:
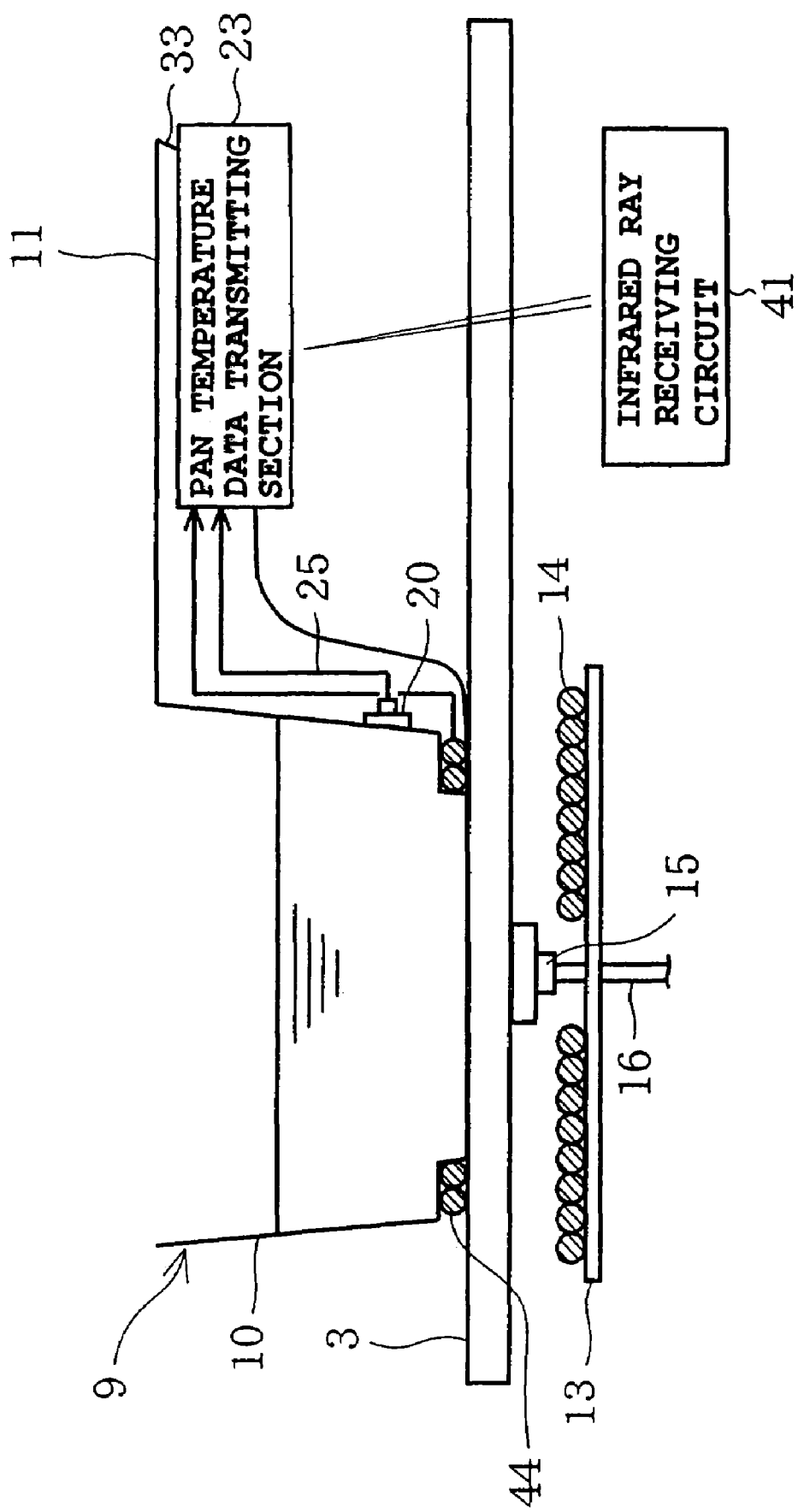
FIG. 14 is a diagram illustrating a dedicated cooking tool set at a top plate according to a third embodiment of implementation of the invention.
Figure 15:
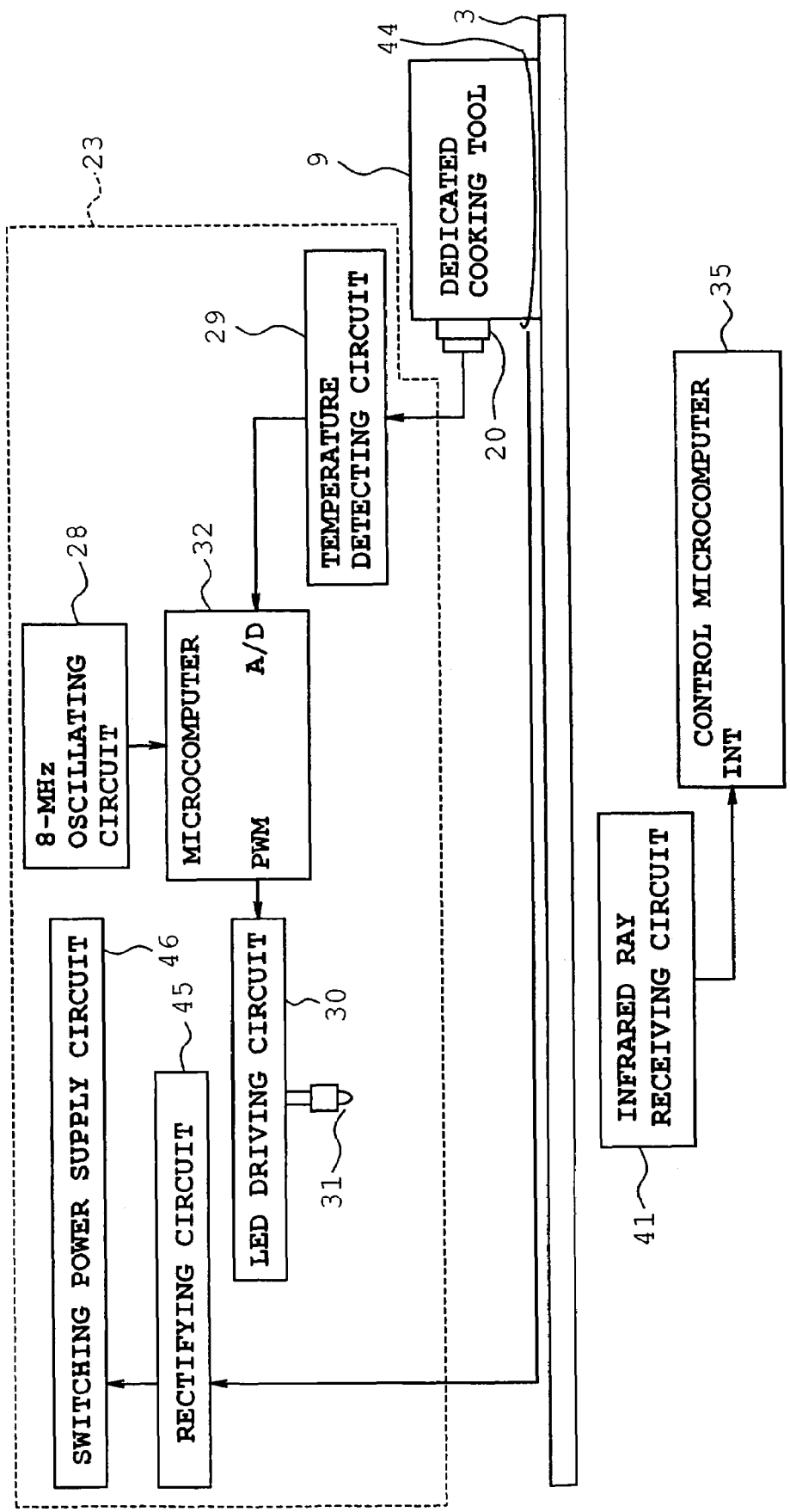
FIG. 15 is a block diagram illustrating the electrical configuration of a temperature data transmitting portion and its peripheral circuits.

FIG. 14 depicts a dedicated cooking tool 9 set on a top plate 3. FIG. 15 depicts the electrical configuration of the temperature data transmitting portion 23 and its peripheral circuits.

The dedicated cooking tool 9 has an annular loop coil 44 attached thereto on the lower surface of the container portion 10. The loop coil 44 is a secondary coil which is magnetically connected to IH coil 14 while the cooking tool 9 is set on the heating mark 8 of the top plate 3. The loop coil 44 is connected to the rectifying circuit 45 of the temperature data transmitting portion 23. The rectifying circuit 45 is adapted to rectify the induced voltage of the loop coil 44. The rectifying circuit 45 has a switching electric supply circuit 46 corresponding to stabilizing electric supply portion connected thereto. The switching electric supply circuit 46 is adapted to keep the output voltage of the rectifying circuit 45 constant and the temperature data transmitting portion 23 is adapted to operate when supplied with electric power by the switching electric supply circuit 46.

Figure 16:
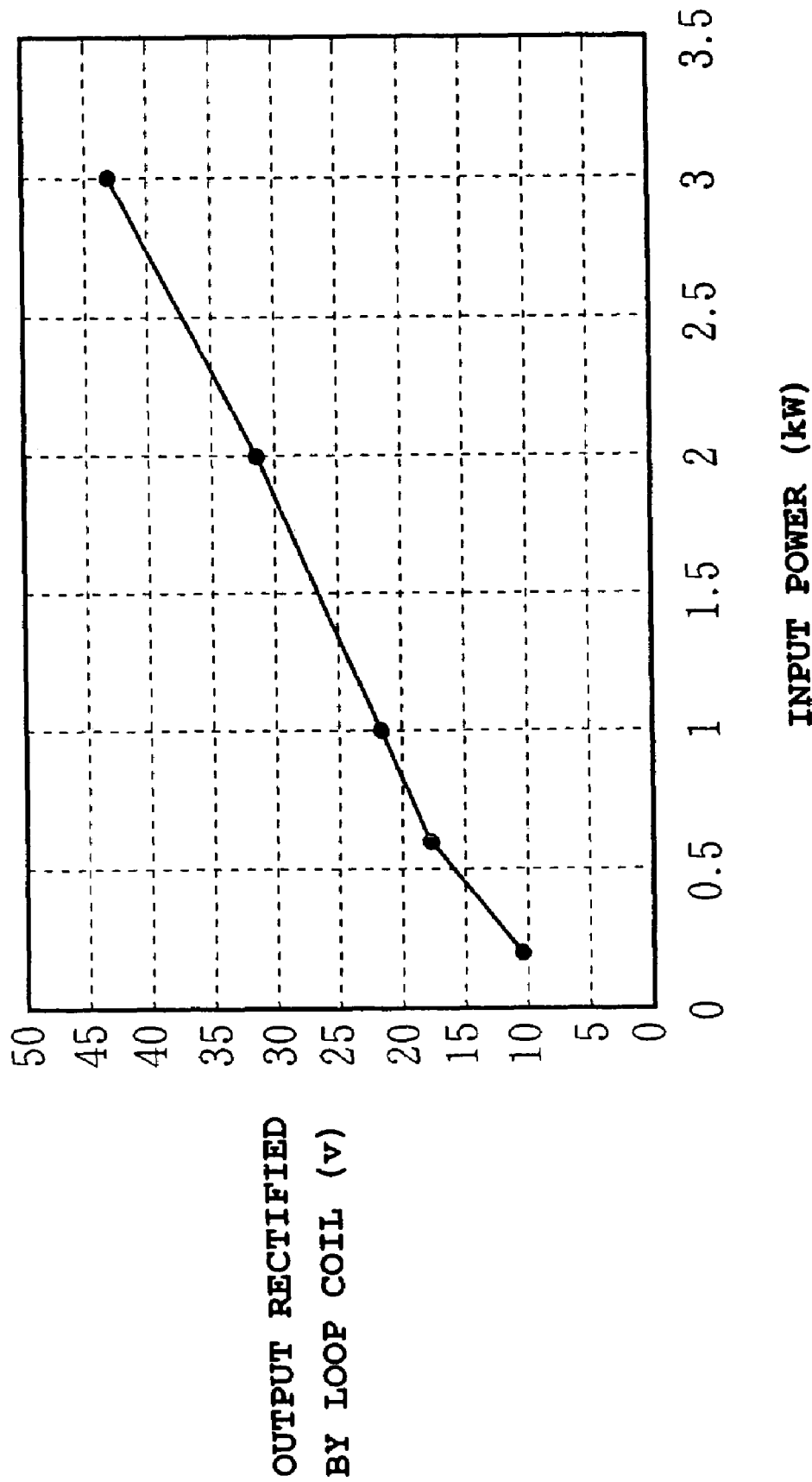
FIG. 16 is a diagram illustrating the relationship between the input electrical power of IH coil and the rectified output from a rectifying circuit.

FIG. 16 depicts the relationship between the input electric power (kW) of IH coil 14 and the rectified output (V) from the rectifying circuit 45. The rectified output from the rectifying circuit 45 increases in proportion to the input voltage of IH coil 14. The rectified output can be kept at 10 V even when the input voltage varies from 200 W to 3 kW. Thus, the switching electric supply circuit 46 can produce a driving current on a stabilized level which doesn't falls below the rated value according to the rectified output from the rectifying circuit 45.

In accordance with the third embodiment, when the cooking tool 9 is set on the heating mark 8 of the top plate 3, the loop coil 44 and IH coil 14 are magnetically connected to each other so that the loop coil 44 is supplied with electric power from IH coil 14, eliminating the necessity of mounting a battery on the cooking tool 9. In this arrangement, there is no necessity of taking troubles in replacement of battery, making it possible to enhance maintenance.

Since the loop coil 44 is disposed at the bottom of the cooking tool 9, the distance between the loop coil 44 and IH coil 14 is reduced while the cooking tool 9 is set on the heating mark 8. In this arrangement, the electromotive force of the loop coil 44 is raised, making it possible to produce electric power necessary for normal operation of the temperature data transmitting portion 23 even when the output of IH coil 14 is small.

Since the rectified output from the rectifying circuit 45 is stabilized by the switching electric supply circuit 46, electric power on a constant level can be stably produced even when the output of IH coil 14 varies.

Embodiment 4

A fourth embodiment of implementation of the invention will be described in connection with FIGS. 17 and 18.

Figure 17:
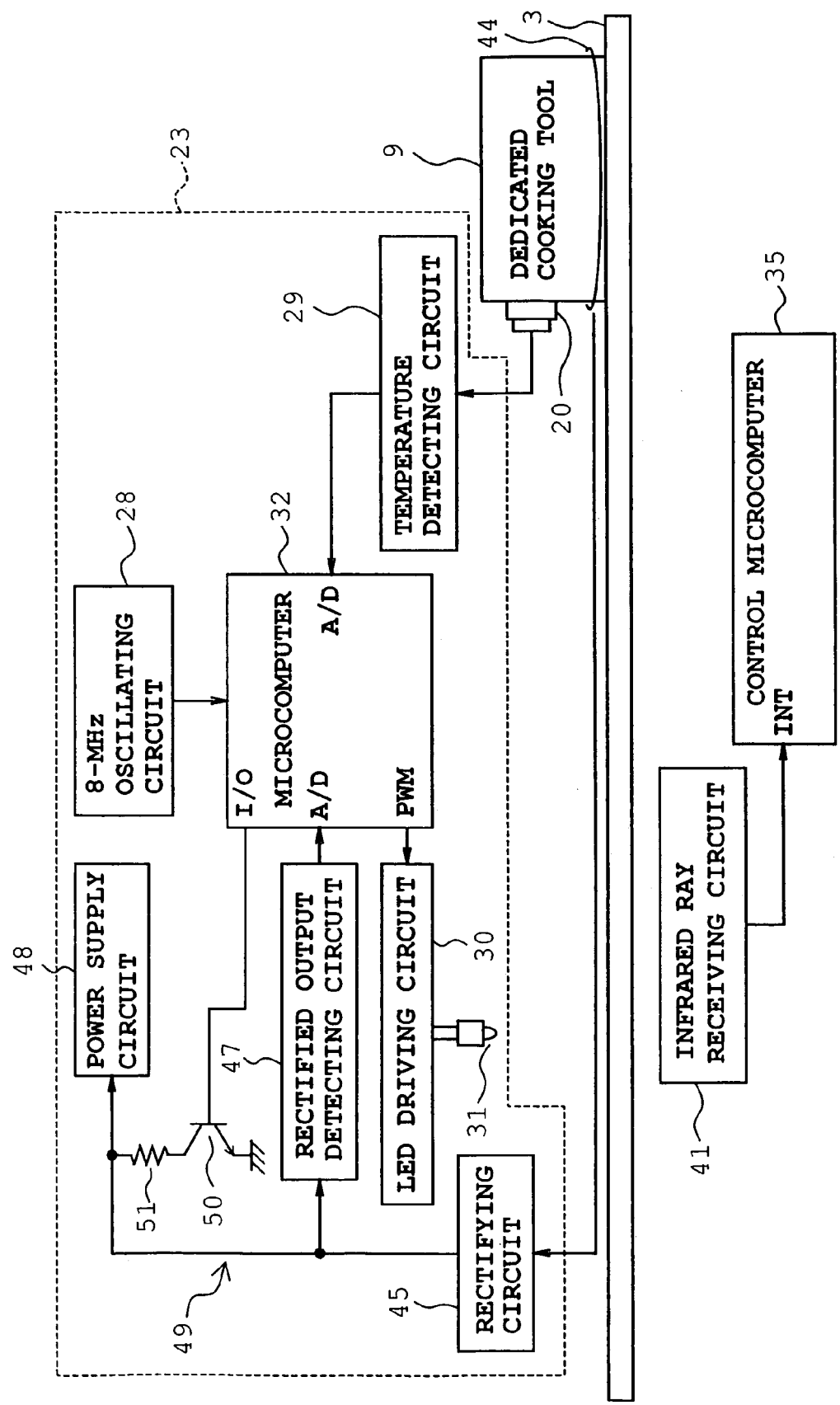
FIG. 17 is a block diagram illustrating the electrical configuration of a temperature data transmitting portion and its peripheral circuits according to a fourth embodiment of implementation of the invention.

FIG. 17 depicts the electrical configuration of the temperature data transmitting portion 23 and its peripheral circuits. The control circuit 32 of the temperature data transmitting portion 23 has a rectified output detecting circuit 47 corresponding to rectified output detecting portion connected thereto. The rectified output detecting circuit 47 is adapted to output a voltage signal on a level corresponding to rectified output from the rectifying circuit 45. The control circuit 32 performs A/D conversion of voltage signal from the rectified output detecting circuit 47 and then detects the magnitude of the rectified output on the basis of the results of A/D conversion.

The rectifying circuit 45 has an electric supply circuit 48 corresponding to stabilizing electric supply portion connected thereto. The electric supply circuit 48 is adapted to produce a driving power for the temperature data transmitting portion 23. The electric supply circuit 48 is composed of series regulator which lowers the rectified output from the rectifying circuit 45 to 5V. The control circuit 32 has an output suppressing circuit 49 connected thereto. The output suppressing circuit 49 is composed of transistor 50 and resistor 51 corresponding to load. When the control circuit 32 switches the transistor 50 ON, the rectified output from the rectifying circuit 45 lowers down.

Figure 18:
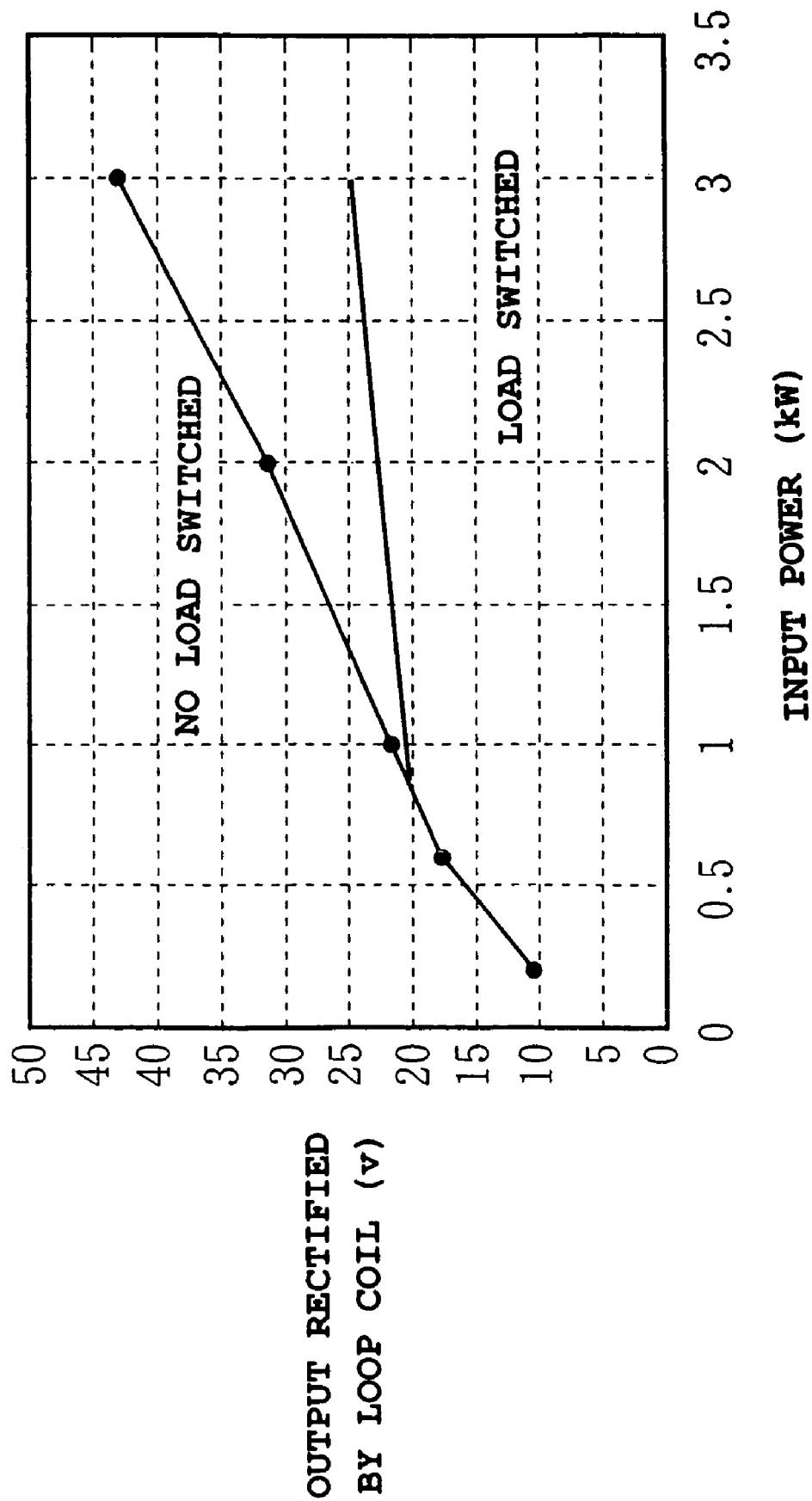
FIG. 18 is a diagram illustrating the relationship between the input electrical power of IH coil and the rectified output from a rectifying circuit.
Figure 19:
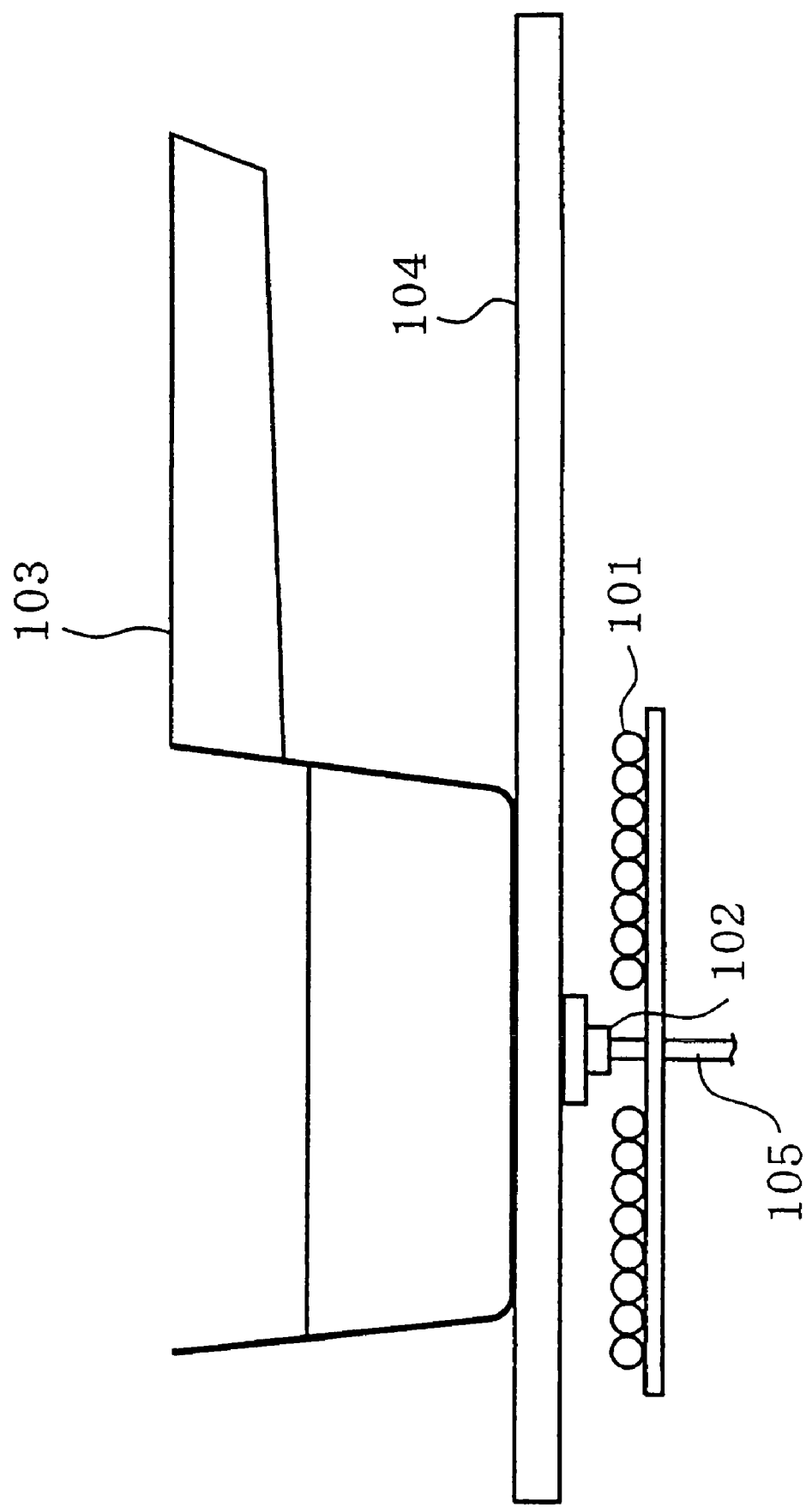
FIG. 19 is a diagram illustrating a cooking tool set at a top plate according to a related art.

FIG. 18 depicts the relationship between the input power of IH coil and the rectified output from the rectifying circuit. The control circuit 32 switches the transistor 50 ON when the detected value of rectified output reaches 20 V. In this arrangement, the rise of the rectified output can be inhibited, making it possible to suppress the rectified output to 25V, which is not greater than the breakdown voltage of the electric supply circuit 48, even when IH coil 14 is driven at a high output of 3 kW.

In accordance with the fourth embodiment, when the rectified output from the rectifying circuit 45 exceeds criterion of 20V, the resistor 51 which is a load is effectuated to inhibit the rise of the rectified output, making it possible to protect the electric supply circuit 48 against overvoltage.

OTHER EMBODIMENTS

The invention is not limited to the examples which have been described and shown in the attached drawings and various modification and expansions can be made therein as described below.

While the invention has been described with reference to the case where the temperature data transmitting portion 23 is fixed to the handgrip portion 11 of the cooking tool 9, the temperature data transmitting portion 23 may be fixed, e.g., to the container portion 10. In the case of this configuration, the temperature data transmitting portion 23 is preferably fixed to the container portion 10 at the site where the temperature rise is slow, particularly at the upper end of the container portion 10.

While the invention has been described with reference to the case where the temperature data transmitting portion 23 is modularized, the modularized temperature data transmitting portion 23 may be further packaged. In some detail, the temperature data transmitting portion 23 may be embedded in a heat-resistant synthetic resin. The infrared ray transmitting module is an assembly having constituents electrically connected to each other in such an arrangement that temperature data can be transmitted in the form of infrared rays. The infrared ray transmitting module is a physically independent unit.

While the invention has been described with reference to the case where cooking data from the temperature data transmitting portion 23 are used to keep the temperature of the dedicated cooking tool 9 as desired, the invention is not limited thereto. For example, temperature signal from the internal temperature sensor 15 may be used.

While the invention has been described with reference to the case where it is judged on the basis of the cooking data from the temperature data transmitting portion 23 to see if water is boiled, it may be additionally judged to see if there is water in the cooking tool. In the case of this configuration, when water boiling is detected in a predetermined period of judging time on the basis of the cooking data from the temperature data transmitting portion 23, it is judged that the cooking tool is heated empty free of water. In this case, automatic water boiling is preferably suspended.

While the invention has been described with reference to the case where cooking data from the temperature data transmitting portion 23 are used for automatic water boiling, the invention is not limited thereto. The cooking data from the temperature data transmitting portion 23 may be used also for automatic cooking involving the heating of the cooking tool 9 to a predetermined temperature data such as tempura cooking, boiling and frying.

While the invention has been described with reference to the case where the surface temperature To of the cooking tool 9 is detected by the external temperature sensor 20, the invention is not limited thereto. For example, the external temperature sensor 20 may detect the temperature of the matters to be cooked in the cooking tool 9 and then transmit the temperature of the matters to be cooked to the heat cooking apparatus in the form of infrared rays. In this case, the external temperature sensor 20 may be fixed to the inner surface of the container portion 10 of the cooking tool 9.

The temperature data may concern the temperature of the cooking tool 9 relative to predetermined standard value, the percent temperature change of the cooking tool 9, the absolute temperature of the matters to be cooked, the temperature of the matters to be cooked relative to predetermined standard value, the percent temperature change of the matters to be cooked, etc., besides the absolute temperature of the cooking tool 9.

In order to facilitate the placing of the cooking tool 9 on the top plate 3, it is preferred that the external temperature sensor 20 be disposed on the side of the cooking tool 9. In order to raise the accuracy of detected temperature of the matters to be cooked, it is preferred that the external temperature sensor 20 be disposed on the lower end of the cooking tool 9.

As the pan electric supply 21 there may be used a secondary battery or solar cell besides primary battery.

The temperature switch 43 may be a spontaneous switch which changes in its state depending on the temperature of the cooking tool.

While the invention has been described in detail and with reference to specific embodiments thereof, it will be apparent to one skilled in the art that various changes and modifications can be made therein without departing from the spirit and scope thereof.

INDUSTRIAL APPLICABILITY

As described above, cooking tool of the present invention is useful for a cooking manner of finishing an object to be cooked in a short period of time into a desired state.

The invention claimed is:

1. A cooking tool used with a heat cooking apparatus having a receiving unit capable of receiving data externally transmitted in the form of infrared rays, the cooking tool being heated by a heating unit of the heat cooking apparatus while being supported by a supporting unit of the heat cooking apparatus, the cooking tool comprising:
   a temperature detecting unit that generates a signal according to a temperature of an object to be cooked;
   a transmitting unit that transmits temperature data corresponding to the output signal from the temperature detecting unit in the form of infrared rays to the heat cooking apparatus; and
   a primary coil and a secondary coil, the secondary coil magnetically connected to the primary coil while the heating unit is being driven to produce electric power for operating the transmitting unit,
   wherein for the case where a high frequency current is caused to flow through the primary coil so that the heating unit of the heat cooking apparatus performs induction heating, the secondary coil is magnetically coupled to the primary coil by passing a high frequency current through the primary coil, and
   wherein the transmitting unit is provided with a rectifying portion to rectify the output voltage from the secondary coil and a stabilizing electric supply portion to stabilize the rectified output voltage from the rectifying portion.

2. The cooking tool according to claim 1, wherein the transmitting unit is provided with a battery that supplies electric power through wire.

3. The cooking tool according to claim 2, further comprising a switching unit of opening/closing the electric power supply circuit between the battery and the transmitting unit according to the temperature of the object to be cooked.

4. The cooking tool according to claim 2, wherein the transmitting unit is provided with an output detector that detects output voltage of the battery output voltage of the battery.

5. The cooking tool according to claim 3, wherein the transmitting unit is provided with an output detector that detects output voltage of the battery.

6. The cooking tool according to claim 1, wherein the secondary coil is provided at the bottom of the vessel portion in which the object to be cooked is charged.

7. The cooking tool according to claim 1, wherein the transmitting unit is provided with a load connected to the output terminal of the rectifying portion, a rectified output detecting portion that detects the magnitude of the rectified output voltage given to the stabilizing electric supply by the rectifying portion, and a rectified output controlling portion that controls the magnitude of the rectified output voltage given to the stabilizing electric supply by the rectifying portion by adjusting the magnitude of the load based on the detection results of the rectified output detecting portion.

8. The cooking tool according to claim 1, wherein the transmitting unit is composed of an infrared ray transmitting module.

* * * * *